(12) United States Patent
Minefuji

(10) Patent No.: US 10,203,487 B2
(45) Date of Patent: Feb. 12, 2019

(54) IMAGING LENS SYSTEM, IMAGING APPARATUS AND PROJECTOR

(71) Applicant: SEIKO EPSON CORPORATION, Tokyo (JP)

(72) Inventor: Nobutaka Minefuji, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/807,022

(22) Filed: Nov. 8, 2017

(65) Prior Publication Data

US 2018/0143411 A1 May 24, 2018

(30) Foreign Application Priority Data

Nov. 21, 2016 (JP) ................................. 2016-225731

(51) Int. Cl.
*G02B 13/06* (2006.01)
*G02B 9/64* (2006.01)
*G02B 13/00* (2006.01)

(52) U.S. Cl.
CPC ............... *G02B 13/06* (2013.01); *G02B 9/64* (2013.01); *G02B 13/006* (2013.01); *G02B 13/0045* (2013.01)

(58) Field of Classification Search
CPC ..................................................... G02B 7/021
USPC .......................................................... 359/725
See application file for complete search history.

(56) References Cited

U.S. PATENT DOCUMENTS

| 7,173,776 | B2 | 2/2007 | Tada et al. |
| 2006/0001985 | A1 | 1/2006 | Tada et al. |
| 2018/0188493 | A1* | 7/2018 | Huang ............... G02B 13/0045 |

FOREIGN PATENT DOCUMENTS

| JP | 2006-17837 A | 1/2006 |
| JP | 2006-98942 A | 4/2006 |

* cited by examiner

*Primary Examiner* — James Jones
(74) *Attorney, Agent, or Firm* — Oliff PLC

(57) ABSTRACT

An imaging lens system (imaging lens) having a focal length f is formed of a first lens group formed of three negative lenses and a single positive lens or a cemented lens and a second lens group having a positive focal length with the first lens group and the second lens group sequentially arranged from the enlargement side and employs the stereographic projection method that satisfies a condition of y=a·f·tan(θ/2) (α: 1.8≤α≤2.2). The thus configured imaging lens system readily allows distortion to be reduced at each image height y and the degree of compression to be also reduced for sufficient resolution at the periphery.

20 Claims, 20 Drawing Sheets

IMAGING LENS SYSTEM, IMAGING APPARATUS AND PROJECTOR

BACKGROUND

1. Technical Field

The present invention relates to a fisheye-type imaging lens system that can be used for a monitoring camera and in other applications and is capable of imaging over a wide field angle, and further relates to an imaging apparatus into which the imaging lens system is incorporated and a projector including the imaging apparatus.

2. Related Art

As a lens for a monitoring camera, a fisheye lens is used so that the monitoring camera can perform imaging over a wide field angle. In recent years, an ultrawide-angle projector, which projects an image over a short distance, and other projectors also use a fisheye lens in some cases to monitor a projection screen and therearound, that is, to detect the position of a pen on the projection screen. The fisheye lens used for such a purpose needs to be compact enough to be incorporated in an instrument and further needs to achieve high resolution for increase in accuracy of the position detection.

A projection method used with a distortion-less lens, such as a typical photographic lens, is called central projection, and the height y of an image is expressed by the following expression (a), in which f represents the focal length and $\theta$ represents the half field angle. In contrast, regarding a fisheye lens, the periphery of a captured image is compressed by a greater amount due to distortion at a greater image height. Projection methods employed by fisheye lenses are classified in accordance with the degree of the compression into the following four methods: an orthographic projection method; an equisolid angle projection method; an equidistance projection method; and a stereographic projection method, and the image height in the imaging plane is expressed by the following Expressions (b) to (e).

(a) Central projection $y=f\cdot\tan(\theta)$
(b) Stereographic projection method $y=2f\cdot\tan(\theta/2)$
(c) Equidistance projection method $y=f\cdot\theta$
(d) Equisolid angle projection method $y=2f\cdot\sin(\theta/2)$
(e) Orthographic projection method $y=f\cdot\sin(\theta)$ A fisheye lens, which has large negative distortion when the image height increases, produces an image with the periphery thereof compressed. In the projection methods described above, the degree of the compression of the periphery of an image increases from (b) to (e), as seen from the expressions described above.

In general, a fisheye lens for photography employs a projection method close to the orthographic projection method and the equisolid angle projection method in many cases. However, the two projection methods, in which the periphery of an image is compressed, have a disadvantage of decrease in resolution at the periphery. In contrast, the equidistance projection method and the stereographic projection method, in which the degree of the compression of the periphery of an image is suppressed as compared with the two projection methods described above, allow increase in resolution at the periphery.

An example of a fisheye lens that employs the equidistance projection method is disclosed in JP-A-2006-17837. The fisheye lens has a long overall length and is suitable for a monitoring camera, but it is difficult to incorporate the fisheye lens in a projector and other similar apparatus from the viewpoint of size.

The stereographic projection method, in which the degree of the compression of the periphery of an image is further smaller than that in the equidistance projection method, allows increase in the resolution at the periphery, but it is known that there is a difficulty designing balanced performance over the entire image from the center to the periphery thereof, and another difficulty manufacturing such a fisheye lens. JP-A-2006-98942 discloses a fisheye lens that employs the stereographic projection method. The fisheye lens has a long overall length, has an F-number of about 2.5, which means insufficient brightness of a capture image, and has room for improvement in cost reduction, for example, employs an aspheric surface as a surface of the largest meniscus lens, which is a first lens.

SUMMARY

An advantage of some aspects of the invention is to provide a fisheye-lens-type imaging lens which produces a bright image corresponding to an F-number of about 2, has a compact size, and is capable of achieving high resolution although using the stereographic projection method employing the same lens configuration as those employed in the orthographic projection method and the equisolid angle projection method or the like.

An imaging lens system according to an aspect of the invention is an imaging lens system including a first lens group having a negative or positive focal length and a second lens group having a positive focal length with the first lens group and the second lens group sequentially arranged from a enlargement side. The imaging lens system has a half field angle of at least 70°. The first lens group is formed of three negative lenses and one positive lens or a cemented lens sequentially arranged from the enlargement side. The imaging lens system satisfies the following conditional expressions (1) and (2):

$$y=\alpha\cdot f\cdot\tan(\theta/2); \text{ and} \quad (1)$$

$$1.0<|f1/f|<2.5, \quad (2)$$

where
y: Image height,
$\alpha$: $1.8\leq\alpha\leq2.2$,
f: Focal length of entire imaging lens system,
$\theta$: Half field angle, and
f1: Combined focal length of three negative lenses disposed on enlargement side in first lens group.

In the imaging lens system described above, when the image height y is so set in accordance with the condition (1) described above that the coefficient $\alpha$ is not smaller than the lower limit thereof, a situation in which each image height is close to that in the equidistance projection method (f·$\theta$) can be avoided. That is, since the amount of distortion can be reduced and the degree of the compression can also be reduced at each image height, sufficient resolution at the periphery of an image is readily achieved. Conversely, when the image height y is so set that the coefficient $\alpha$ is not greater than the upper limit thereof, a situation in which the degree of difficulty in lens design increases can be avoided, whereby increase in the number of lenses and hence increase in cost can be suppressed. When |f1/f| is so set as not to be smaller than the lower limit thereof in the conditional expression (2), a situation in which the first lens group has an excessively short focal length can be avoided, and comma and astigmatism can be readily suppressed with a necessary back focal distance ensured. Conversely, when |f1/f| is so set as not to be greater than the upper limit thereof in the conditional expression (2), a situation in which the first lens group has an excessively long focal length can be avoided, and comma and astigmatism can be so corrected that the amounts of correction are well balanced with the amounts of the axial chromatic aberration and the chromatic aberration of magnification reduced.

In a specific aspect of the invention, the second lens group is formed of at least one positive lens, a cemented lens formed of a set of a negative lens and a positive lens, and at least one positive lens having a convex surface facing a reduction side with the lenses sequentially arranged from the enlargement side, and the imaging lens system satisfies the following conditional expression (3):

$$2.0 < f2/f < 4.0, \quad (3)$$

where f2 represents the focal length of the second lens group.

When f2/f is so set as not to be smaller than the lower limit thereof in the conditional expression (3), a situation in which the second lens group has too large power so that the curvature of each lens of the second lens group is excessively small can be avoided, whereby astigmatism at the level of the optical axis, an intermediate image height, and the maximum image height can be readily so corrected that the amounts of correction are well balanced. Conversely, when f2/f is so set as not to be greater than the upper limit thereof in the conditional expression (3), a situation in which the second lens group has too small power can be avoided, whereby the overall length of the second lens group can be readily suppressed, and increase in the positive power of the second lens group is suppressed so that the amounts of comma and field curvature are readily corrected.

In another aspect of the invention, the first lens group is formed of five lenses sequentially arranged from the enlargement side, the three negative lenses that are meniscus lenses each having a convex surface facing the magnifying side and a cemented lens formed of a set of a negative lens and a positive lens, and the negative lenses are all formed of spherical lenses.

In the above description, a satisfactory stereographic projection characteristic can be obtained by arranging three negative lenses disposed on the enlargement side and each having a convex surface facing the enlargement side. Further, using a cemented lens allows reduction in the chromatic aberrations and other aberrations and decrease in sensitivity to decentering of a lens, whereby manufacturing variation can be reduced. Moreover, the negative lenses, each of which tends to be a relatively large lens, are all formed of spherical lenses for suppression of an increase in cost.

In still another aspect of the invention, the first lens group is formed of four lenses sequentially arranged from the enlargement side, the three lenses that are two meniscus lenses each having a convex surface facing the enlargement side and one negative lens, and the positive lens is a biconvex lens, and the negative lenses are all formed of spherical lenses.

In the above description, in which a simple configuration with the number of lenses reduced is employed and the lenses are appropriately arranged, the stereographic projection method can be sufficiently satisfied. Further, the negative lenses, each of which tends to be a relatively large lens, are all formed of spherical lenses for suppression of an increase in cost.

In still another aspect of the invention, the second lens group is formed of a positive lens having a convex surface facing the reduction side, a cemented lens formed of a set of a negative lens having a concave surface facing the enlargement side and a biconvex positive lens, and at least one positive lens sequentially arranged from the enlargement side.

In the above description, the second lens group can be compact with a balance between the first lens group and the second lens group achieved.

In still another aspect of the invention, at least one convex aspheric surface is on a lens having positive power. Configuring a positive lens in the first lens group or a lens in the second lens group to have an aspheric surface allows occurrence of spherical aberration and comma to be eliminated with the F-number increased and high contrast to be maintained also at a high spatial frequency corresponding to minute pixels. Further, configuring a convex surface of a biconvex lens or a meniscus lens to be an aspheric surface also allows cost reduction.

In still another aspect of the invention, let Vd1 be a difference between an average of Abbe numbers of the negative lenses in the first lens group and an Abbe number of the positive lens in the first lens group, and let Vd2 be an average of Abbe numbers of positive lenses in the second lens group, and the first and second lens groups satisfy the following conditional expressions (4) and (5):

$$15.0 < Vd1 < 30.0; \text{ and} \quad (4)$$

$$Vd2 > 50.0. \quad (5)$$

In the case of an imaging system used, for example, in a projector, since the tip of a pen or a fingertip is illuminated with video light from the projector main body or indoor illumination light, sufficient contrast is not provided in some cases depending on the location pointed by the pen or the finger. To avoid such a situation, infrared light invisible to the eyes is used in some cases as auxiliary light, and the imaging lens is therefore required to provide sufficient resolution both for visible light and infrared light.

Selecting glass materials that form the positive lenses in the first lens group and the second lens group and have Abbe numbers that fall within the conditional expressions (4) and (5) described above allows sufficient performance to be achieved both for visible light and infrared light, for example, when the tip of a pen or a fingertip in the vicinity of a projection screen is imaged. Selecting Abbe numbers of the glass materials that fall within the range expressed by the conditional expression (4) allows decrease in the chromatic aberration of magnification produced by the first lens group. Selecting Abbe numbers of the glass materials of the positive lenses in the second lens group that fall within the range expressed by the conditional expression (5) allows correction of axial chromatic aberration in such a way that the amounts of correction are well balanced.

In still another aspect of the invention, let TL be an overall length of the imaging lens system from a first lens on the enlargement side to a last lens on a reduction side, and the following conditional expression (6) is satisfied:

$$10 < TL/f < 20. \quad (6)$$

An imaging apparatus according to another aspect of the invention is equipped with any of the imaging lens systems described above.

Since the imaging apparatus is equipped with any of the imaging lens systems described above, the imaging lens system, which produces a bright image, has a compact size, and has a wide field angle but produces only a small amount of compression at the periphery of the image, can acquire a high-resolution target image and can also be readily incorporated in a projector or any other apparatus.

A projector according to another aspect of the invention is a projector including at least one imaging apparatus described above and a projection system that projects video light, and the imaging apparatus images an area irradiated with the video light projected via the projection system.

In the above description, the imaging apparatus can image the area irradiated with the video light (projection screen) projected via the projection system at high resolution. As a result, for example, in a case where the tip of a pen or a fingertip is present in the vicinity of the projection screen on which the projector projects an image, the tip of the pen or the fingertip can be reliably imaged and captured, whereby what is called an interactive projector including an interface that detects the position of the fingertip can be provided.

In a specific aspect of the invention, the two equipped imaging apparatus allow more advanced position detection based on stereo vision, and as the configuration of an interactive projector, only the imaging apparatus allows reliable detection of the position of a fingertip.

BRIEF DESCRIPTION OF THE DRAWINGS

The invention will be described with reference to the accompanying drawings, wherein like numbers reference like elements.

DESCRIPTION OF EXEMPLARY EMBODIMENTS

An imaging lens system according to an embodiment of the invention and an imaging apparatus that incorporates the imaging lens system will be described below with reference to the drawings.

Figure 1:
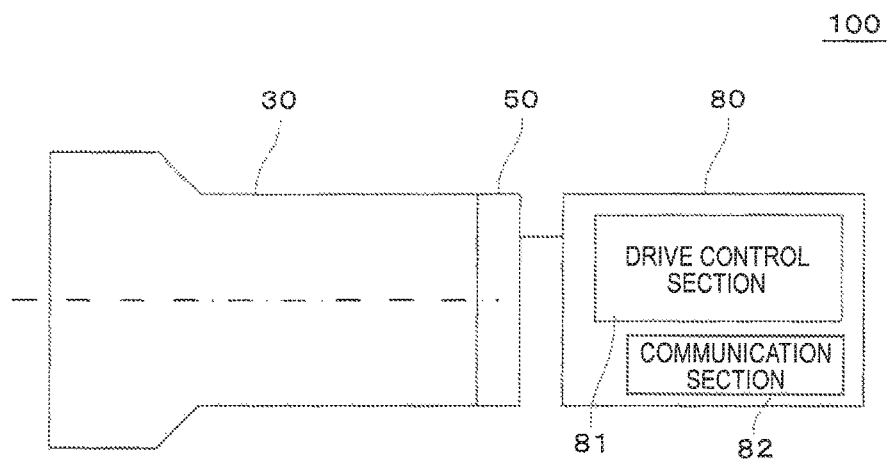
FIG. 1 shows a schematic configuration of an imaging apparatus equipped with an imaging lens system according to an embodiment.

An imaging apparatus 100 equipped with an imaging lens system shown in FIG. 1 is equipped, for example, in a projector or a monitoring camera and includes not only an imaging lens system 30 according to the present embodiment but an imaging device 50 and a controller 80.

The imaging lens system 30 projects an image on an object onto the imaging device 50 and is formed of a plurality of lenses, stops, and other components accommodated in a barrel. An example of the configuration of the lenses and other components that are essential portions of the imaging lens system 30 will be described later with reference to FIG. 2 and other figures.

The imaging device 50 is formed of a solid-state imaging device, for example, a CCD image sensor and a CMOS image sensor. The imaging device 50 can receive and sense not only visible light but infrared light (IR light) and captures still images and video images.

The controller 80 controls the entire imaging apparatus 100 and communicates with a control section of an apparatus (projector, for example) equipped with the imaging apparatus 100. To this end, the controller 80 includes a drive control section 81, which drives and controls the imaging device 50 and the imaging lens system 30, which form the imaging apparatus 100, and a communication section 82, which sends and receives information to and from another apparatus and the like. In this case, the imaging device 50 and the imaging lens system 30 perform imaging in accordance with a drive signal from the drive control section 81 of the controller 80 and can operate, for example, via the communication section 82, in synchronization with a variety of actions of a main body apparatus of the projector or any other apparatus equipped with the imaging apparatus 100. That is, the imaging device 50 and the imaging lens system 30 can also operate in accordance with an instruction from the main body apparatus of the projector or any other apparatus.

Figure 2:
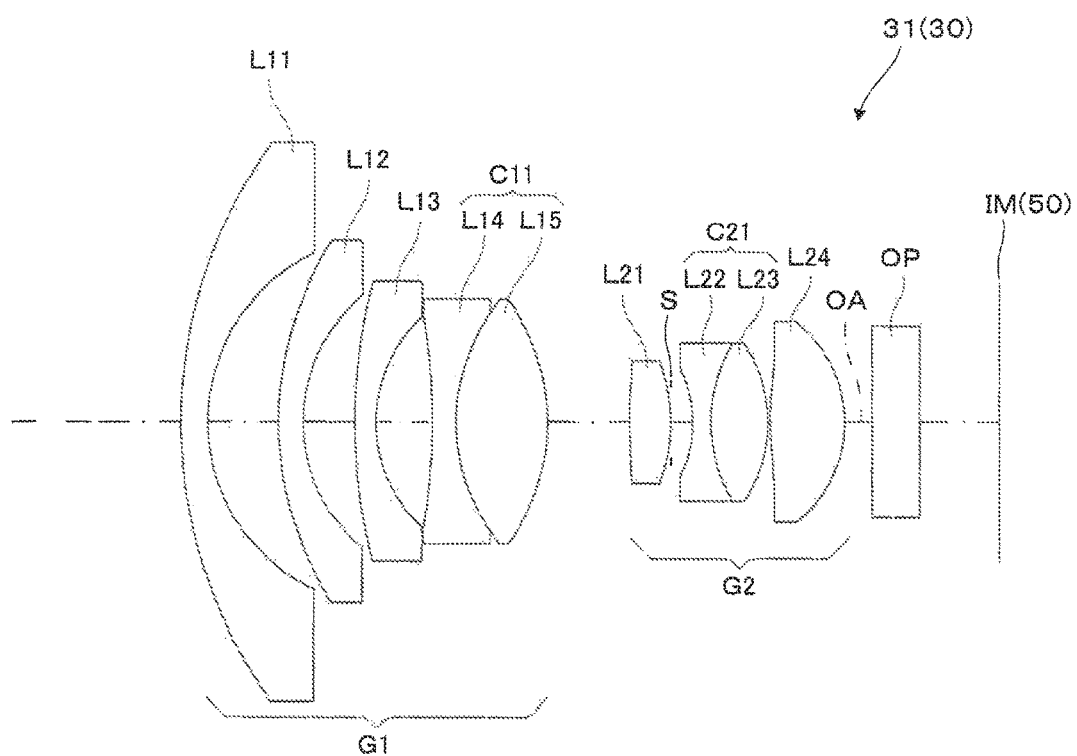
FIG. 2 shows the configuration of the imaging lens system according to the embodiment or Example 1.

An example of the configuration of an imaging lens 31, which is a main body portion of the imaging lens system 30, will be described below with reference to FIG. 2. The imaging lens system 30 or the imaging lens 31, which forms the imaging lens system 30, is a fisheye-type lens having a half field angle of at least 70° and is formed of a first lens group G1 and the second lens group G2 sequentially arranged from the object side (left in FIG. 2), that is, the enlargement side along an optical axis OA, as shown in FIG. 2. The imaging lens system 30 (or imaging lens 31) includes a stop S and a filter OP.

The first lens group G1 is a lens group formed of five lenses (lenses L11 to L15). Specifically, the first lens group G1 is formed of three negative lenses (lenses L11 to L13) and a set of lenses (lenses L14 and L15) that form a cemented lens sequentially arranged from the enlargement side, and the first lens group G1 has a negative focal length.

The second lens group G2 is a lens group formed of four lenses (lenses L21 to L24). Specifically, the second lens group G has a stop S and is formed of a single positive lens (lens L21) located in a position shifted from the stop S toward the enlargement side, a cemented lens C21, which is a set of a negative lens (lens L22) and a positive lens (lens L23) and is located in a position shifted from the stop S toward the reduction side, that is, the image side, and a single positive lens (lens L24) having a convex surface facing the reduction side, and the second lens group G2 has a positive focal length.

Among the lenses described above that form the imaging lens system 30, the fifth lens L15 has an aspheric surface on the reduction side, and the ninth lens L24 has aspheric surfaces on both sides. That is, the imaging lens system 30 has at least one convex aspheric surface on any of the lenses having positive power.

The filter OP is disposed in a position shifted from the imaging lens 31 toward the reduction side (image side). In other words, the filter OP is disposed between the imaging lens 31 and the image plane IM (image plane in imaging device 50). The filter OP is a plate-shaped member and is so provided that the flat surfaces thereof are perpendicular or roughly perpendicular to the optical axis OA, as shown in FIG. 2. Further, the filter OP is allowed to slide, for example, in the direction perpendicular to the optical axis OA so that the filter OP can be inserted into and retracted from the optical path of the imaging apparatus 100. The filter OP, which is formed, for example, of a transparent glass substrate on which any of a variety of films is formed, functions as a color filter, a lowpass filter, or any other filter. Since the filter OP can be inserted and retracted, the optical path can be adjusted. For example, chromatic aberrations can be adjusted when a case where the imaging device 50 receives visible light i and a case where the imaging device 50 receives infrared light (IR light). The filter OP may be formed of a plurality of filters OP, and one filter OP may be replaced with another.

The thus configured imaging lens system 30 (imaging lens 31) satisfies the following conditional expressions (1) and (2) on the lenses:

$$y = \alpha \cdot f \tan(\theta/2); \text{ and} \quad (1)$$

$$1.0 < |f1/f| < 2.5, \quad (2)$$

where
y: Image height,
α: $1.8 \leq \alpha \leq 2.2$,
f: Focal length of entire imaging lens system,
θ: Half field angle, and
f1: Combined focal length of three negative lenses L11 to L13 disposed on enlargement side in first lens group G1.

In the imaging lens system 30 described above, when the image height y is so set in accordance with the condition (1) described above that the coefficient α is not smaller than the lower limit thereof, a situation in which each image height is close to that in the equidistance projection method (f·θ) can be avoided. That is, since the amount of distortion can be reduced and the degree of the compression can also be reduced at each image height, sufficient resolution at the periphery of an image is readily achieved. Conversely, when the image height y is so set that the coefficient α is not greater than the upper limit thereof, a situation in which the degree of difficulty in lens design increases can be avoided, whereby increase in the number of lenses and hence increase in cost can be suppressed. When |f1/f| is so set as not to be smaller than the lower limit thereof in the conditional expression (2), a situation in which the first lens group G1 has an excessively short focal length can be avoided, and comma and astigmatism can be readily suppressed with a necessary back focal distance ensured. Conversely, when |f1/f| is so set as not to be greater than the upper limit thereof in the conditional expression (2), a situation in which the first lens group G1 has an excessively long focal length can be avoided, and comma and astigmatism can be so corrected that the amounts of correction are well balanced with the amounts of the axial chromatic aberration and the chromatic aberration of magnification reduced.

Further, the second lens group G2 satisfies the following conditional expression (3):

$$2.0 < f2/f < 4.0, \quad (3)$$

where f2 represents the focal length of the second lens group.

When f2/f is so set as not to be smaller than the lower limit thereof in the conditional expression (3), a situation in which the second lens group G2 has too large power so that the curvature of each lens of the second lens group G2 is excessively small can be avoided, whereby astigmatism at the level of the optical axis center, an intermediate image height, and the maximum image height can be readily so corrected that the amounts of correction are well balanced. Conversely, when f2/f is so set as not to be greater than the upper limit thereof in the conditional expression (3), a situation in which the second lens group G2 has too small power can be avoided, whereby the overall length of the second lens group G2 can be readily suppressed, and increase in the positive power of the second lens group G2 is suppressed so that the amounts of comma and field curvature are readily corrected.

Further, let Vd1 be the difference between the average of Abbe numbers of the negative lenses (lenses L11 to L14) in the first lens group G1 and the Abbe number of the positive lens (lens L15) in the first lens group G1, and let Vd2 be the average of Abbe numbers of the positive lenses (lens L21, L23, and L24) in the second lens group G2. Under the above definitions, the first and second lens groups G1, G2 satisfy the following conditional expressions (4) and (5):

$$15.0 < Vd1 < 30.0; \text{ and} \quad (4)$$

$$Vd2 > 50.0. \quad (5)$$

Selecting glass materials that form the positive lenses in the first lens group G1 and the second lens group G2 and have Abbe numbers that fall within the conditional expressions (4) and (5) described above allows sufficient performance to be achieved both for visible light and infrared light, for example, when the imaging apparatus 100 images the tip of a pen or a fingertip in the vicinity of the projection screen on which a projector equipped with the imaging apparatus 100 projects an image. Selecting Abbe numbers of the glass materials that fall within the range expressed by the conditional expression (4) allows decrease in the chromatic aberration of magnification produced by the first lens group G1. Selecting Abbe numbers of the glass materials of the positive lenses in the second lens group G2 that fall within the range expressed by the conditional expression (5) allows correction of axial chromatic aberration in such a way that the amounts of correction are well balanced.

Further, let TL be the overall length of the imaging lens system 30 from the first lens (lens L11) on the enlargement side to the last lens (lens L24) on the reduction side, and the following conditional expression (6) is satisfied:

$$10 < TL/f < 20. \quad (6)$$

That is, the imaging lens system 30 has a compact size as a whole as compared with a typical size of a fisheye-type optical system used in a monitoring camera and other applications.

Since the imaging apparatus 100 is equipped with the imaging lens system 30 described above, the imaging lens system 30, which produces a bright image, has a compact size, and produces only a small amount of distortion, can acquire a high-resolution target image and can also be readily incorporated in a projector or any other apparatus.

EXAMPLES

Specific examples of the imaging lens system 30 (imaging lens 31) will be described below. The meanings of various parameters common to Examples 1 to 6 described below are summarized as follows.

R: Radius of curvature
D: On-axis inter-surface space (thickness of lens or space between lenses)
Nd: Refractive index at d line
Vd: Abbe number at d line
f: Focal length
FNo: F-number
θ: Half field angle An aspheric surface is expressed by the following polynomial (expression of aspheric surface):

$$z = \frac{ch^2}{1+\sqrt{1-(k+1)c^2h^2}} + A_4h^4 + A_6h^6 + A_8h^8 + A_{10}h^{10}$$

where
c: Curvature (1/R)
h: Height from optical axis
k: Conic coefficient of aspheric surface
Ai: Higher-order aspheric coefficient of aspheric surface OBJ stands for the image plane (projection surface) on a screen that is a target to be imaged, STO stands for the stop S, and IMG stands for the image plane (panel surface) IM. A surface labeled with a surface number preceded by "*" is a surface having an aspheric shape. The two surfaces before IMG correspond to the filter OP.

Example 1

Table 1 shown below shows data on the lens surfaces in Example 1.

TABLE 1 f 1.726
FNo 2.0
θ 80.0°

| | R | D | Nd | Vd |
|---|---|---|---|---|
| OBJ | Infinity | 300.000 | | |
| 1 | 18.365 | 1.000 | 1.81600 | 46.62 |
| 2 | 7.127 | 2.687 | | |
| 3 | 12.942 | 0.900 | 1.81600 | 46.62 |
| 4 | 6.256 | 1.951 | | |
| 5 | 20.963 | 0.800 | 1.80610 | 40.93 |
| 6 | 5.569 | 2.103 | | |
| 7 | −25.048 | 0.900 | 1.83481 | 42.72 |
| 8 | 7.323 | 3.500 | 1.82115 | 24.06 |
| *9 | −7.101 | 3.056 | | |
| 10 | 33.957 | 1.544 | 1.56883 | 56.36 |
| 11 | −6.554 | 0.000 | | |

TABLE 1-continued f 1.726
FNo 2.0
θ 80.0°

| | R | D | Nd | Vd |
|---|---|---|---|---|
| STO12 | Infinity | 0.812 | | |
| 13 | −4.737 | 0.700 | 1.84666 | 23.78 |
| 14 | 6.000 | 2.147 | 1.61800 | 63.33 |
| 15 | −5.448 | 0.100 | | |
| *16 | 12.972 | 2.800 | 1.59201 | 67.02 |
| *17 | −4.762 | 1.000 | | |
| 18 | Infinity | 1.800 | 1.51633 | 64.14 |
| 19 | Infinity | 3.000 | | |
| IMG | Infinity | 0.000 | | |

FIG. 2 shown as an embodiment of the imaging lens system also corresponds to a cross-sectional view of the imaging lens system 30 (imaging lens 31) according to Example 1.

Table 2 shown below shows aspheric coefficients of the lens surfaces in Example 1.

TABLE 2

| | Surface number | | |
|---|---|---|---|
| | 9 | 16 | 17 |
| K | −1.0434 | −0.9870 | 0.00000 |
| A04 | 1.6161E−04 | −1.9356E−03 | 4.4369E−04 |
| A06 | −1.0469E−05 | 0.0000E+00 | 9.9655E−07 |
| A08 | 0.0000E+00 | 0.0000E+00 | 0.0000E+00 |
| A10 | 0.0000E+00 | 0.0000E+00 | 0.0000E+00 |

In Table 2 described above and the following tables, 10 raised to some power ($1.00 \times 10^{+18}$, for example) is expressed by using E (1.00E+18, for example).

The imaging lens system 30 (imaging lens 31) includes, as the first lens group G1, the following lenses sequentially arranged from the enlargement side: a first lens (lens L11) that is a negative meniscus lens having a convex surface facing the enlargement side; a second lens (lens L12) that is a negative meniscus lens having a convex surface facing the enlargement side; a third lens (lens L13) that is a negative meniscus lens having a convex surface facing the enlargement side; and a cemented C11, which is formed of a fourth lens (lens L14) that is a biconcave negative lens and a fifth lens (lens L15) that is a biconvex positive lens. The imaging lens system 30 (imaging lens 31) includes, as the second lens group G2, the following lenses sequentially arranged from the enlargement side: a sixth lens (lens L21) that is a biconvex positive lens; a cemented lens C21, which is formed of a seventh lens (lens L22) that is a biconcave negative lens and an eighth lens (lens L23) that is a biconvex positive lens; and a ninth lens (lens L24) that is a biconvex positive lens. That is, the imaging lens system 30 is formed of nine lenses. The nine lenses L11 to L15 and L21 to L24 each have a circular shape axially symmetric with respect to the optical axis OA. Among the nine lenses, the reduction-side surface of the fifth lens L15 and the both surfaces of the ninth lens L24 are each an aspheric surface. The other surfaces are all spherical surfaces.

In Example 1, the first lens group G1 is formed of five lenses, three negative meniscus lenses (lenses L11 to L13) each having a convex surface facing the enlargement side and the cemented lens C21 formed of a set of a negative lens and a positive lens (lens L14 and L15), and the negative lenses (lenses L11 to L14 and L22) are all formed of spherical lenses. in this case, the use of a cemented lens is advantageous, for example, from the viewpoint of reduction in chromatic aberrations. Further, the negative lenses, each of which tends to be a relatively large lens, are all formed of spherical lenses for suppression of an increase in cost.

In Example 1, a fisheye lens, which have the fifth lens (lens L15), which have aspheric surface as a smallest-diameter lens, and the ninth lens (lens L24), which is the last lens, is so achieved to be compact and capable of high resolution with a sufficient amount of light provided down to the peripheral edge of an image although employing the stereographic projection method.

Further, in Example 1, the second lens group G2 is formed of the positive lens (lens L21) having a convex surface facing the reduction side, the cemented lens C21, which is formed of a set of a negative lens having a concave surface facing the enlargement side and a biconvex positive lens (lenses L22 and L23), and a single positive lens (L24) sequentially arranged from the enlargement side, whereby the second lens group G2 is compact with a balance between the first lens group G1 and the second lens group G2 achieved.

Figure 3:
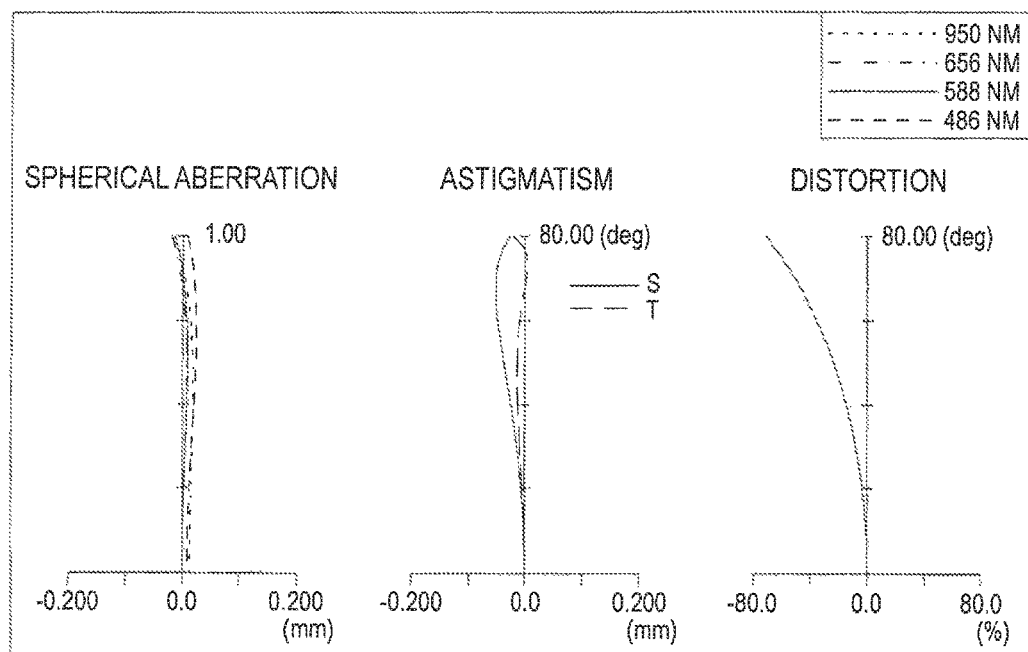
FIG. 3 is a reduction-side aberration diagram of the imaging lens system according to Example 1.
Figure 4:
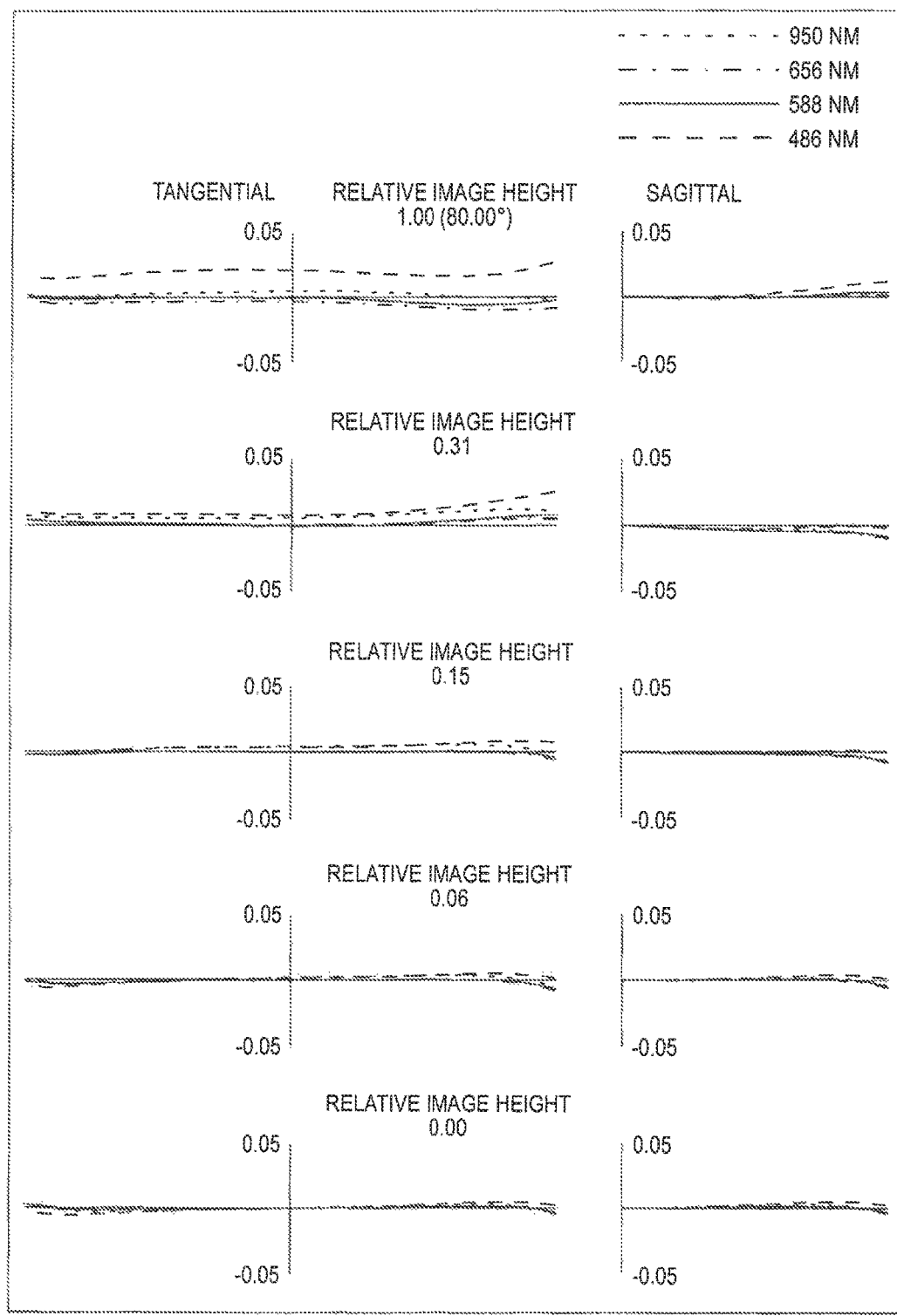
FIG. 4 is a lateral aberration diagram of the imaging lens system according to Example 1.

FIG. 3 is a reduction-side aberration diagram of the imaging lens system and shows spherical aberration, astigmatism, and distortion sequentially from the left, as shown in FIG. 3. In FIG. 3, not only visible light but infrared light are considered as targets to be received (imaged), as described above. The aberrations shown in FIG. 3 are therefore those at a reference wavelength of 588 nm and other wavelengths of 656 nm and 486 nm as wavelengths of the visible light and at a wavelength of 950 nm as a wavelength of the infrared light. FIG. 4 is a lateral aberration diagram of the imaging lens system and corresponds to FIG. 3. FIG. 4 shows lateral aberrations at relative image heights of 1.00, 0.31, 0.15, 0.06, and 0.00 (corresponding to angles of 80°, 60°, 40°, 20°, and 0°, respectively) sequentially from above.

Example 2

Table 3 shown below shows data on the lens surfaces in Example 2.

TABLE 3

| f 1.737 FNo 2.0 θ 80.0° | | | | |
|---|---|---|---|---|
| | R | D | Nd | Vd |
| OBJ | Infinity | 300.000 | | |
| 1 | 17.533 | 1.000 | 1.81600 | 46.62 |
| 2 | 8.672 | 2.836 | | |
| 3 | 15.146 | 0.900 | 1.81600 | 46.62 |
| 4 | 6.344 | 2.625 | | |
| 5 | 26.438 | 0.800 | 1.80610 | 40.93 |
| 6 | 6.169 | 4.151 | | |
| 7 | 30.091 | 2.200 | 1.92286 | 20.88 |
| 8 | −12.306 | 3.516 | | |
| *9 | −5.943 | 0.995 | 1.58913 | 61.15 |
| *10 | −4.013 | 0.100 | | |
| STO11 | Infinity | 0.677 | | |
| 12 | −4.275 | 0.700 | 1.80809 | 22.76 |
| 13 | 8.879 | 3.200 | 1.59522 | 67.73 |
| 14 | −4.323 | 0.200 | | |
| 15 | 94.574 | 2.000 | 1.61800 | 63.33 |
| 16 | −9.738 | 0.100 | | |
| 17 | 18.254 | 2.000 | 1.59522 | 67.73 |
| 18 | −16.277 | 1.000 | | |
| 19 | Infinity | 1.800 | 1.51633 | 64.14 |

TABLE 3-continued

| f 1.737 FNo 2.0 θ 80.0° | | | | |
|---|---|---|---|---|
| | R | D | Nd | Vd |
| 20 | Infinity | 3.000 | | |
| IMG | Infinity | 0.000 | | |

Figure 5:
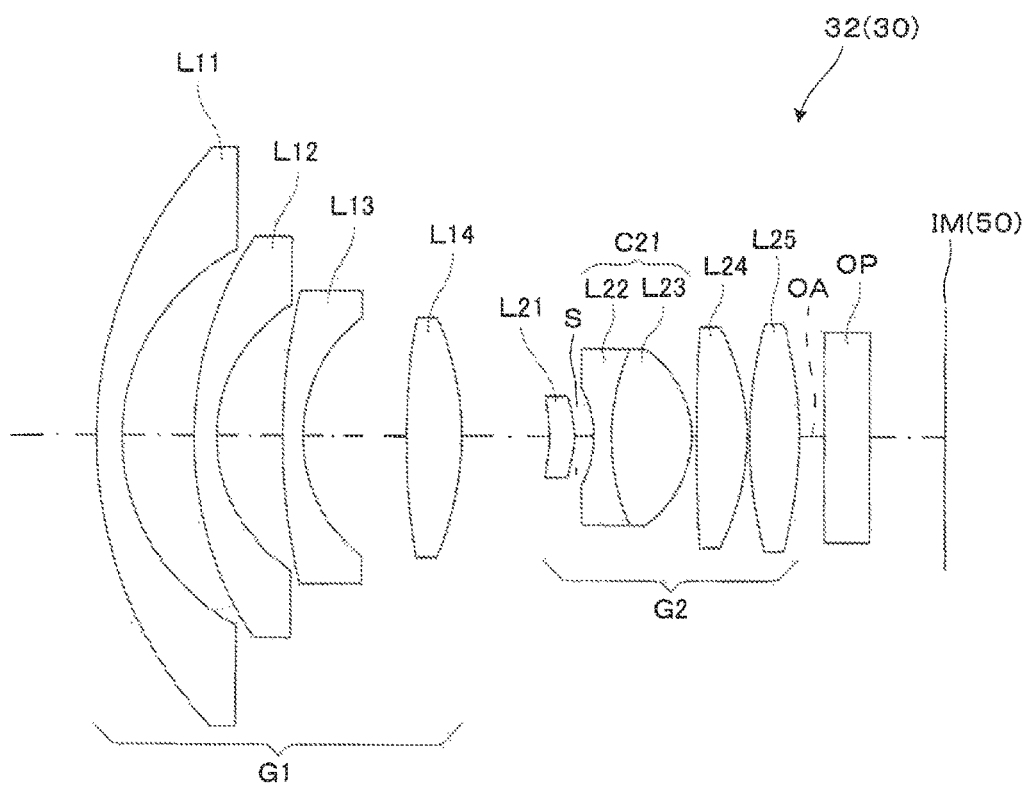
FIG. 5 shows the configuration of an imaging lens system according to Example 2.

FIG. 5 is a cross-sectional view of an imaging lens system according to Example 2.

Table 4 shown below shows aspheric coefficients of the lens surfaces in Example 2.

TABLE 4

| | Surface number | |
|---|---|---|
| | 9 | 10 |
| K | −13.1674 | −2.8701 |
| A04 | −1.0182E−03 | 4.6990E−03 |
| A06 | 1.3932E−03 | 9.4454E−04 |
| A08 | 0.0000E+00 | 0.0000E+00 |
| A10 | 0.0000E+00 | 0.0000E+00 |

The imaging lens system 30 (imaging lens 32) includes, as the first lens group G1, the following lenses sequentially arranged from the enlargement side: a first lens (lens L11) that is a negative meniscus lens having a convex surface facing the enlargement side; a second lens (lens L12) that is a negative meniscus lens having a convex surface facing the enlargement side; a third lens (lens L13) that is a negative meniscus lens having a convex surface facing the enlargement side; and a fourth lens (lens L14) that is a biconvex positive lens. The imaging lens system 30 (imaging lens 32) includes, as the second lens group G2, the following lenses sequentially arranged from the enlargement side: a fifth lens (lens L21) that a positive meniscus lens having a convex surface facing the reduction side; a cemented lens C21, which is formed of a sixth lens (lens L22) that is a biconcave negative lens and a seventh lens (lens L23) that is a biconvex positive lens; an eighth lens (lens L24) that is a biconvex positive lens; and a ninth lens (lens L25) that is a biconvex positive lens. That is, the imaging lens system 30 is formed of nine lenses. The nine lenses L11 to L14 and L21 to L25 each have a circular shape axially symmetric with respect to the optical axis OA. Among the nine lenses, the fifth lens L21 has aspheric surfaces on both sides. The other surfaces are all spherical surfaces.

In Example 2, the first lens group G1 is formed of four lenses sequentially arranged from the enlargement side, two meniscus lenses (lenses L11 and L12) each having a convex surface facing the enlargement side, a negative lens (lens L13), and a biconvex positive lens (lens L14), and the negative lenses are all formed of spherical lenses.

In Example 1 described above, the last lens (lens L24 closest to reduction side, see FIG. 2) has aspheric surfaces, whereas in Example 2, in the second lens group G2, which forms the reduction side, the last reduction-side lens is formed of two spherical lenses (lenses L24 and L25) as lenses corresponding to the last lens in Example 1, and only the fifth lens (lens L21), which can be the smallest-diameter lens, has aspheric surfaces. Compactness is thus achieved with increase in cost due to aspheric surfaces minimized.

In Example 2, in which the relatively large last lens is a spherical lens and the first lens group G1 is formed of single lenses (first lens group G1 includes no cemented lens), compactness and cost reduction are maintained with the total number of constituent lenses being equal to that in Example 1.

Figure 6:
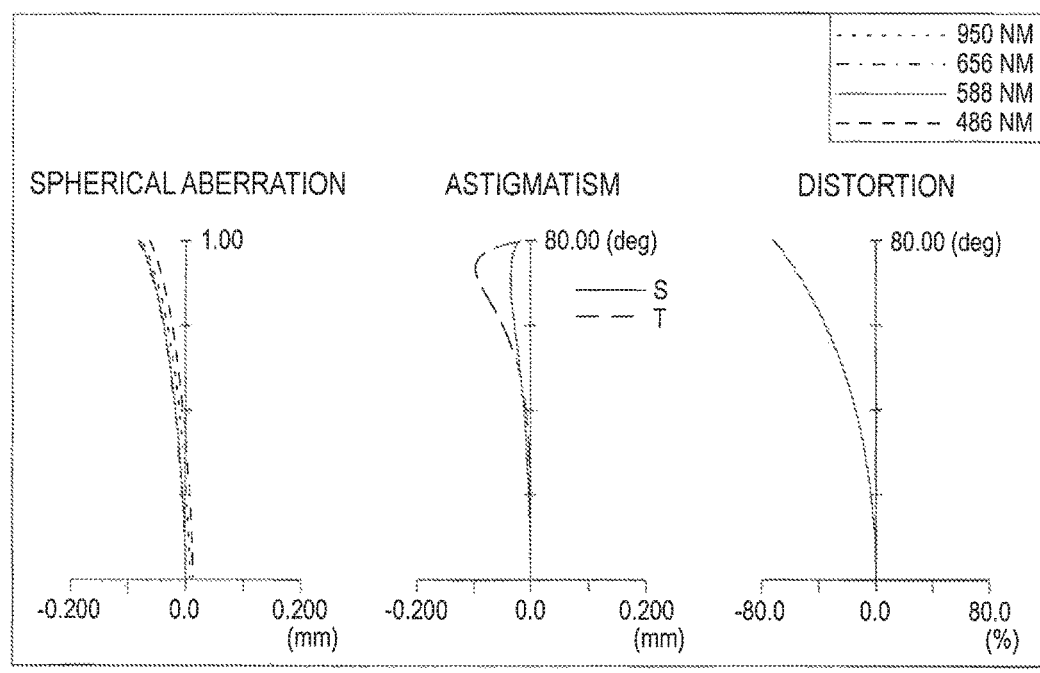
FIG. 6 is a reduction-side aberration diagram of the imaging lens system according to Example 2.
Figure 7:
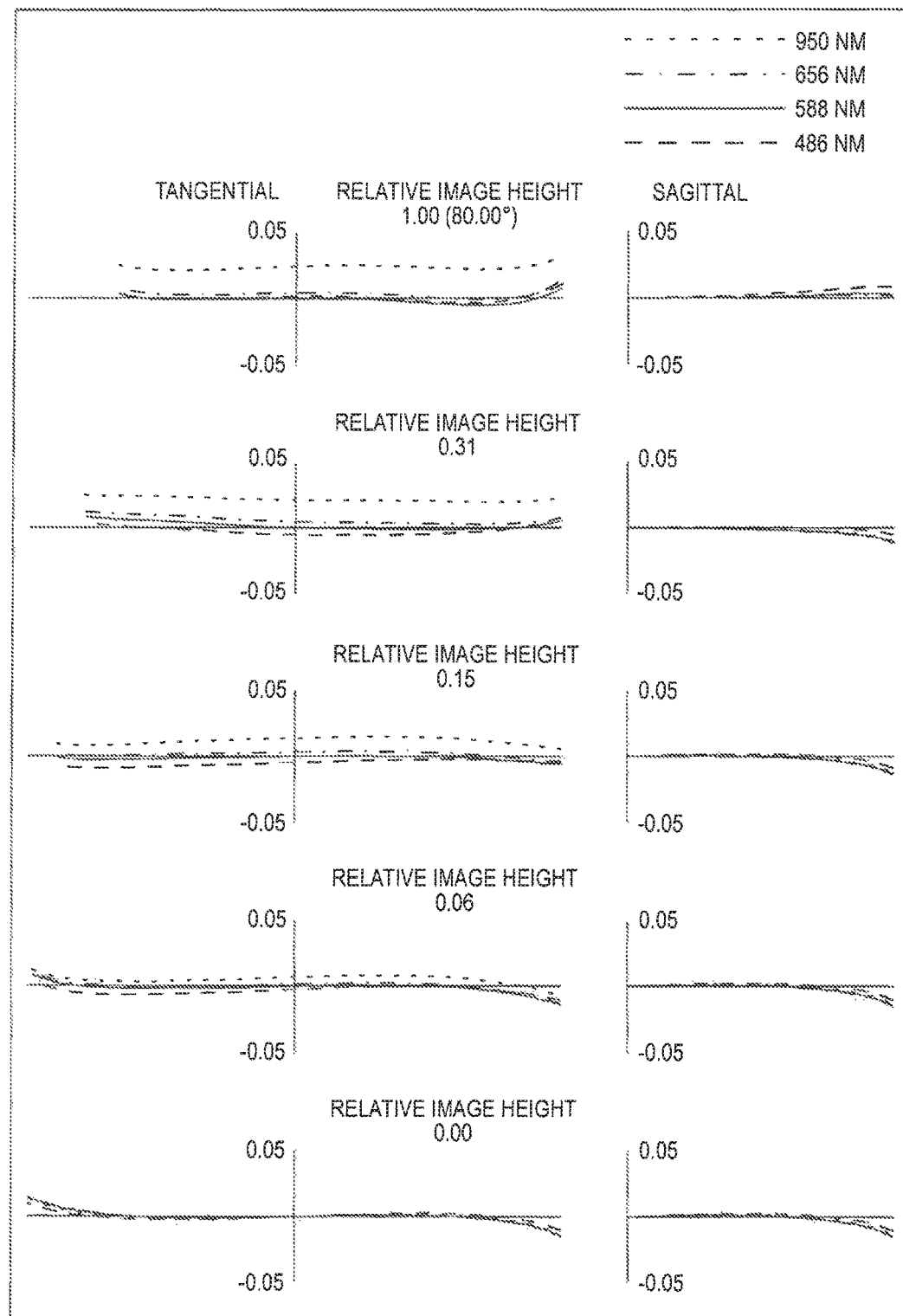
FIG. 7 is a lateral aberration diagram of the imaging lens system according to Example 2.

FIG. 6 is a reduction-side aberration diagram of the imaging lens system and shows spherical aberration, astigmatism, and distortion sequentially from the left, as shown in FIG. 6. FIG. 7 is a lateral aberration diagram of the imaging lens system and corresponds to FIG. 6. FIG. 7 shows lateral aberrations at the relative image heights of 1.00, 0.31, 0.15, 0.06, and 0.00 sequentially from above.

Example 3

Table 5 shown below shows data on the lens surfaces in Example 3.

TABLE 5 f 1.690
FNo 2.0
θ 80.0°

| | R | D | Nd | Vd |
|---|---|---|---|---|
| OBJ | Infinity | 300.000 | | |
| 1 | 14.612 | 1.000 | 1.81600 | 46.62 |
| 2 | 6.588 | 2.634 | | |
| 3 | 13.352 | 0.900 | 1.81600 | 46.62 |
| 4 | 4.330 | 2.519 | | |
| 5 | 337.762 | 0.800 | 1.83481 | 42.72 |
| 6 | 5.571 | 1.821 | | |
| 7 | 27.505 | 2.000 | 1.92286 | 20.88 |
| 8 | −8.810 | 2.226 | | |
| *9 | −9.957 | 1.604 | 1.55332 | 71.68 |
| *10 | −4.809 | 1.131 | | |
| STO11 | Infinity | 1.581 | | |
| 12 | −9.179 | 0.700 | 1.92286 | 20.88 |
| 13 | 6.161 | 2.084 | 1.61800 | 63.39 |
| 14 | −10.068 | 0.200 | | |
| *15 | 7.493 | 3.800 | 1.55332 | 71.68 |
| *16 | −3.937 | 1.000 | | |
| 17 | Infinity | 1.800 | 1.51633 | 64.14 |
| 18 | Infinity | 3.000 | | |
| IMG | Infinity | 0.000 | | |

Figure 8:
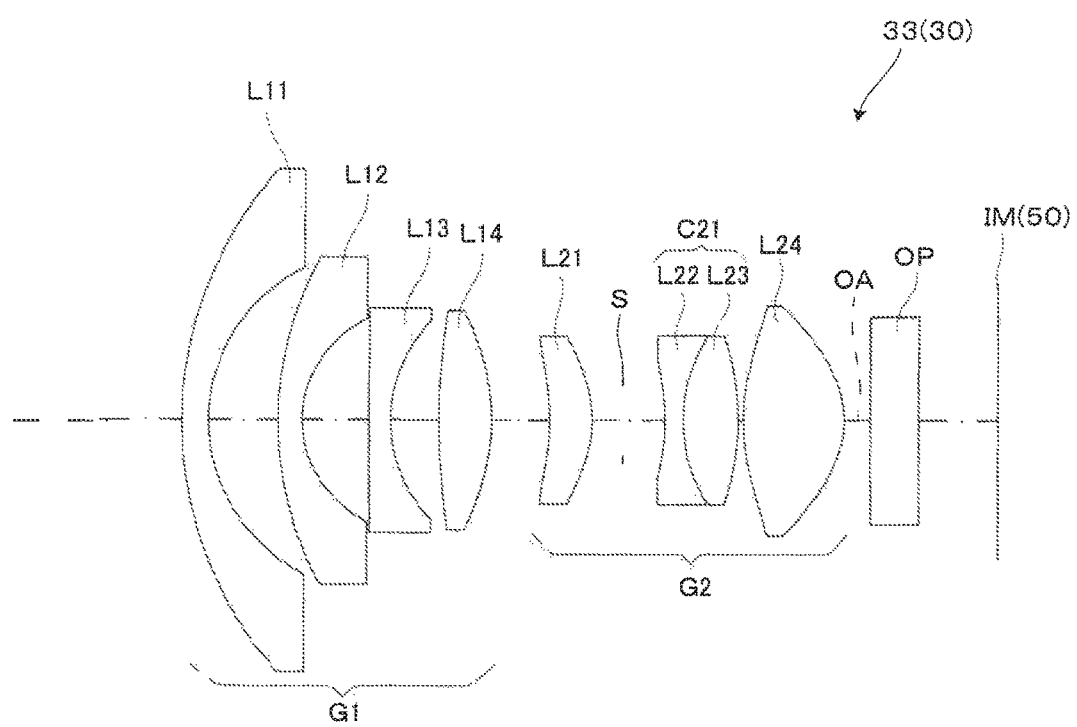
FIG. 8 shows the configuration of an imaging lens system according to Example 3.

FIG. 8 is a cross-sectional view of an imaging lens system according to Example 3.

Table 6 shown below shows aspheric coefficients of the lens surfaces in Example 3.

TABLE 6

| | Surface number | | | |
|---|---|---|---|---|
| | 9 | 10 | 15 | 16 |
| K | 0.0000 | −0.7927 | −9.0440 | −0.4264 |
| A04 | −2.0231E−05 | 7.2589E−04 | 2.9563E−04 | 1.9975E−03 |
| A06 | 1.5191E−04 | 5.2675E−05 | −1.2400E−05 | −1.7495E−05 |
| A08 | −8.0932E−07 | 0.0000E+00 | 0.0000E+00 | −1.7823E−06 |
| A10 | 0.0000E+00 | 0.0000E+00 | 0.0000E+00 | |

The imaging lens system 30 (imaging lens 33) includes, as the first lens group G1, the following lenses sequentially arranged from the enlargement side: a first lens (lens L11) that is a negative meniscus lens having a convex surface facing the enlargement side; a second lens (lens L12) that is a negative meniscus lens having a convex surface facing the enlargement side; a third lens (lens L13) that is a negative meniscus lens having a convex surface facing the enlargement side; and a fourth lens (lens L14) that is a biconvex positive lens. The imaging lens system 30 (imaging lens 32) includes, as the second lens group G2, the following lenses sequentially arranged from the enlargement side: a fifth lens (lens L21) that is a positive meniscus lens having a convex surface facing the reduction side; a cemented lens C21, which is formed of a sixth lens (lens L22) that is a biconcave negative lens and a seventh lens (lens L23) that is a biconvex positive lens; and an eighth lens (lens L24) that is a biconvex positive lens. That is, the imaging lens system 30 is formed of eight lenses. The eight lenses L11 to L14 and L21 to L24 each have a circular shape axially symmetric with respect to the optical axis OA. Among the eight lenses, the reduction-side surface of the fifth lens L21 and the reduction-side surface of the eighth lens L24 are each an aspheric surface. The other surfaces are all spherical surfaces.

In Example 3, introducing two aspheric surfaces achieves further reduction in the number of lenses and compactness.

Figure 9:
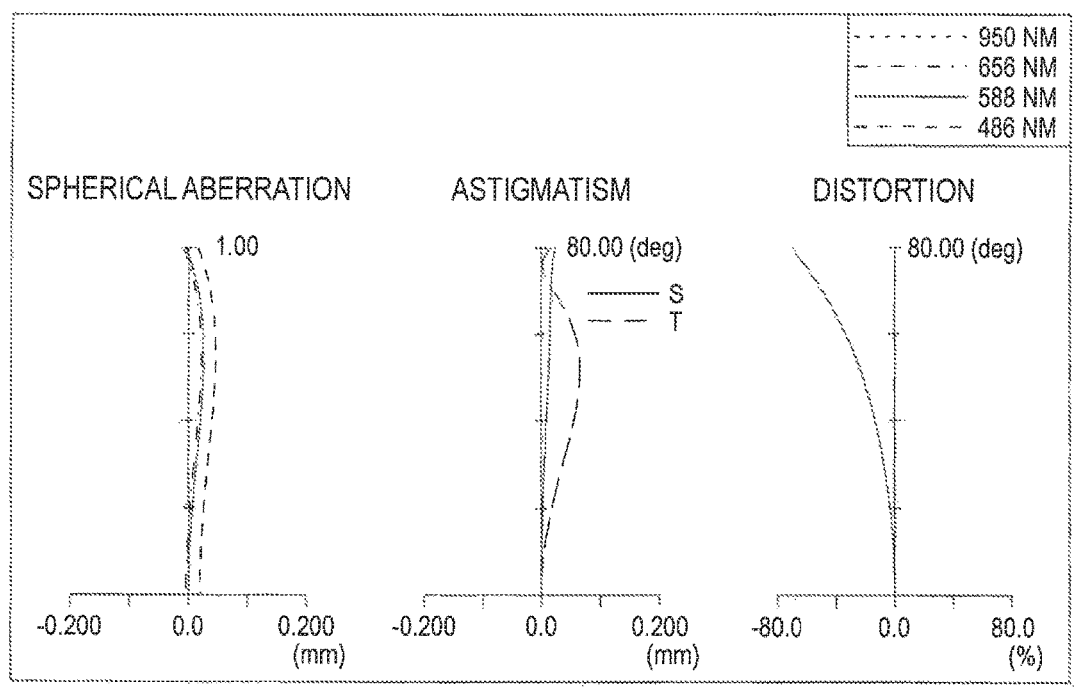
FIG. 9 is a reduction-side aberration diagram of the imaging lens system according to Example 3.
Figure 10:
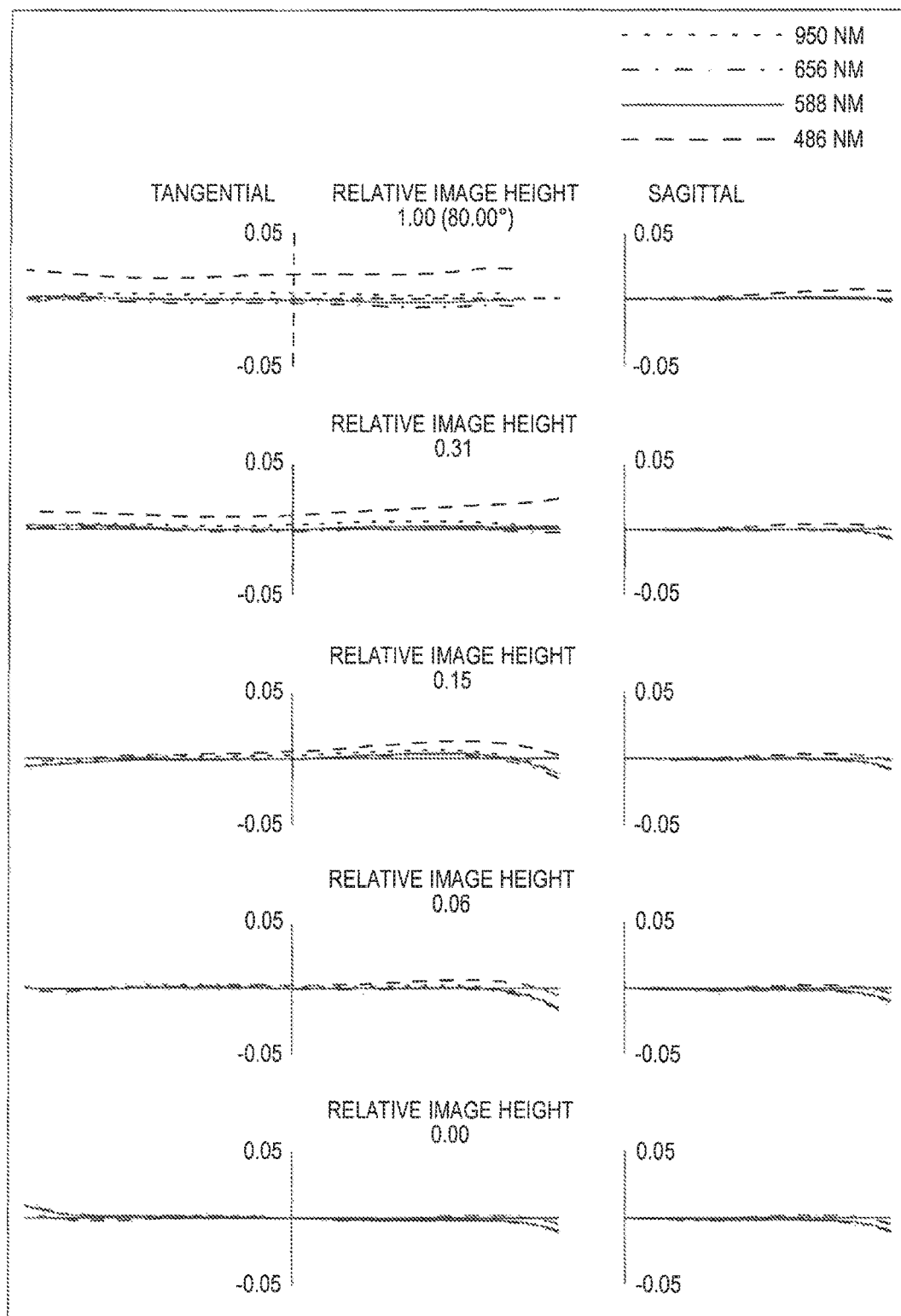
FIG. 10 is a lateral aberration diagram of the imaging lens system according to Example 3.

FIG. 9 is a reduction-side aberration diagram of the imaging lens system and shows spherical aberration, astigmatism, and distortion sequentially from the left, as shown in FIG. 9. FIG. 10 is a lateral aberration diagram of the imaging lens system and corresponds to FIG. 9. FIG. 10 shows lateral aberrations at the relative image heights of 1.00, 0.31, 0.15, 0.06, and 0.00 sequentially from above.

Example 4

Table 7 shown below shows data on the lens surfaces in Example 4.

TABLE 7 f 1.725
FNo 2.0
θ 80.0°

| | R | D | Nd | Vd |
|---|---|---|---|---|
| OBJ | Infinity | 300.000 | | |
| 1 | 16.697 | 1.000 | 1.91082 | 35.25 |
| 2 | 8.491 | 2.942 | | |
| 3 | 15.687 | 1.000 | 1.91082 | 35.25 |
| 4 | 6.074 | 3.027 | | |
| 5 | 155.505 | 1.000 | 1.80610 | 40.93 |
| 6 | 8.000 | 2.057 | | |
| 7 | −19.852 | 1.000 | 1.49700 | 81.54 |
| 8 | 12.824 | 3.000 | 1.80809 | 22.76 |
| 9 | −10.935 | 5.128 | | |
| 10 | 7.303 | 1.481 | 1.65160 | 58.55 |
| 11 | −11.041 | 0.500 | | |
| STO12 | Infinity | 0.500 | | |
| 13 | −5.348 | 1.884 | 1.84666 | 23.78 |
| 14 | 4.363 | 3.000 | 1.62280 | 57.05 |
| 15 | −5.063 | 0.100 | | |
| 16 | 14.440 | 1.446 | 1.62041 | 60.29 |
| 17 | −30.898 | 0.100 | | |
| 18 | 6.390 | 1.488 | 1.61800 | 63.33 |
| 19 | 13.496 | 0.547 | | |
| 20 | Infinity | 1.800 | 1.51633 | 64.14 |
| 21 | Infinity | 2.000 | | |
| IMG | Infinity | 0.000 | | |

Figure 11:
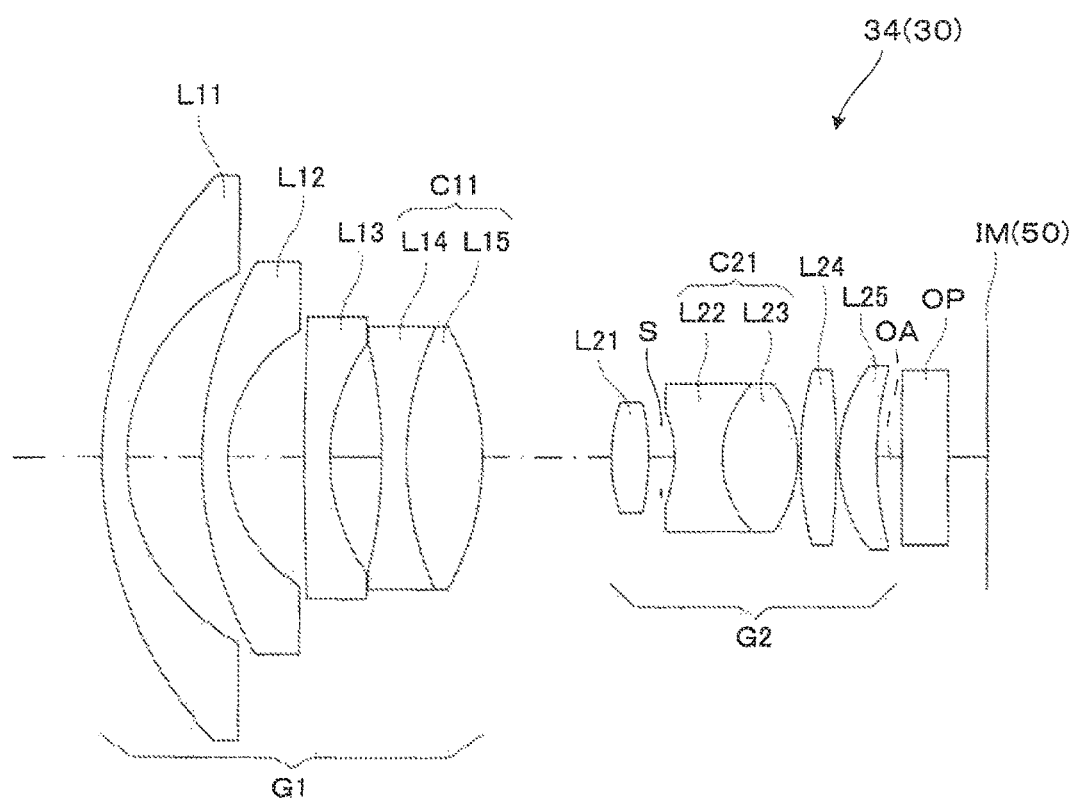
FIG. 11 shows the configuration of an imaging lens system according to Example 4.

FIG. 11 is a cross-sectional view of an imaging lens system according to Example 4. In Example 4, all lenses are formed of spherical lenses, and no aspheric surface is present.

The imaging lens system 30 (imaging lens 34) includes, as the first lens group G1, the following lenses sequentially arranged from the enlargement side: a first lens (lens L11) that is a negative meniscus lens having a convex surface facing the enlargement side; a second lens (lens L12) that is a negative meniscus lens having a convex surface facing the enlargement side; a third lens (lens L13) that is a negative meniscus lens having a convex surface facing the enlargement side; and a cemented lens C11, which is formed of a fourth lens (lens L14) that is a biconcave negative lens and a fifth lens (lens L15) that is a biconvex positive lens. The imaging lens system 30 (imaging lens 34) includes, as the second lens group G2, the following lenses sequentially arranged from the enlargement side: a sixth lens (lens L21) that is a positive meniscus lens having a convex surface facing the reduction side; a cemented lens C21, which is formed of a seventh lens (lens L22) that is a biconcave negative lens and an eighth lens (lens L23) that is a biconvex positive lens; a ninth lens (lens L24) that is a biconvex positive lens, and a tenth lens (lens L25) that is a positive lens having a convex surface facing the enlargement side. That is, the imaging lens system 30 is formed of ten lenses. The ten lenses L11 to L15 and L21 to L25 each have a circular shape axially symmetric with respect to the optical axis OA and all have spherical surfaces.

In the case where all lenses are formed of spherical lenses, the number of constituent lenses is greater than that in the case where an aspheric lens is used, undesirably resulting in increases in the overall length and the maximum diameter. However, in a case where there is enough room, reduction in initial cost, such as the cost involved in manufacture of an aspheric surface (die cost, for example), a short manufacturing period, and other advantages are provided.

Figure 12:
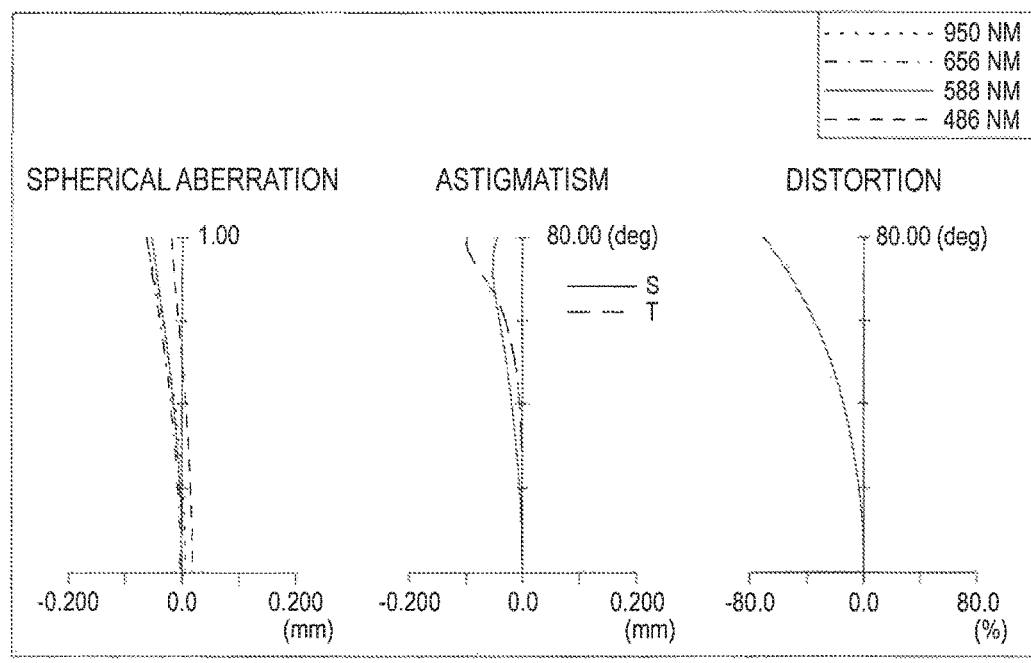
FIG. 12 is a reduction-side aberration diagram of the imaging lens system according to Example 4.
Figure 13:
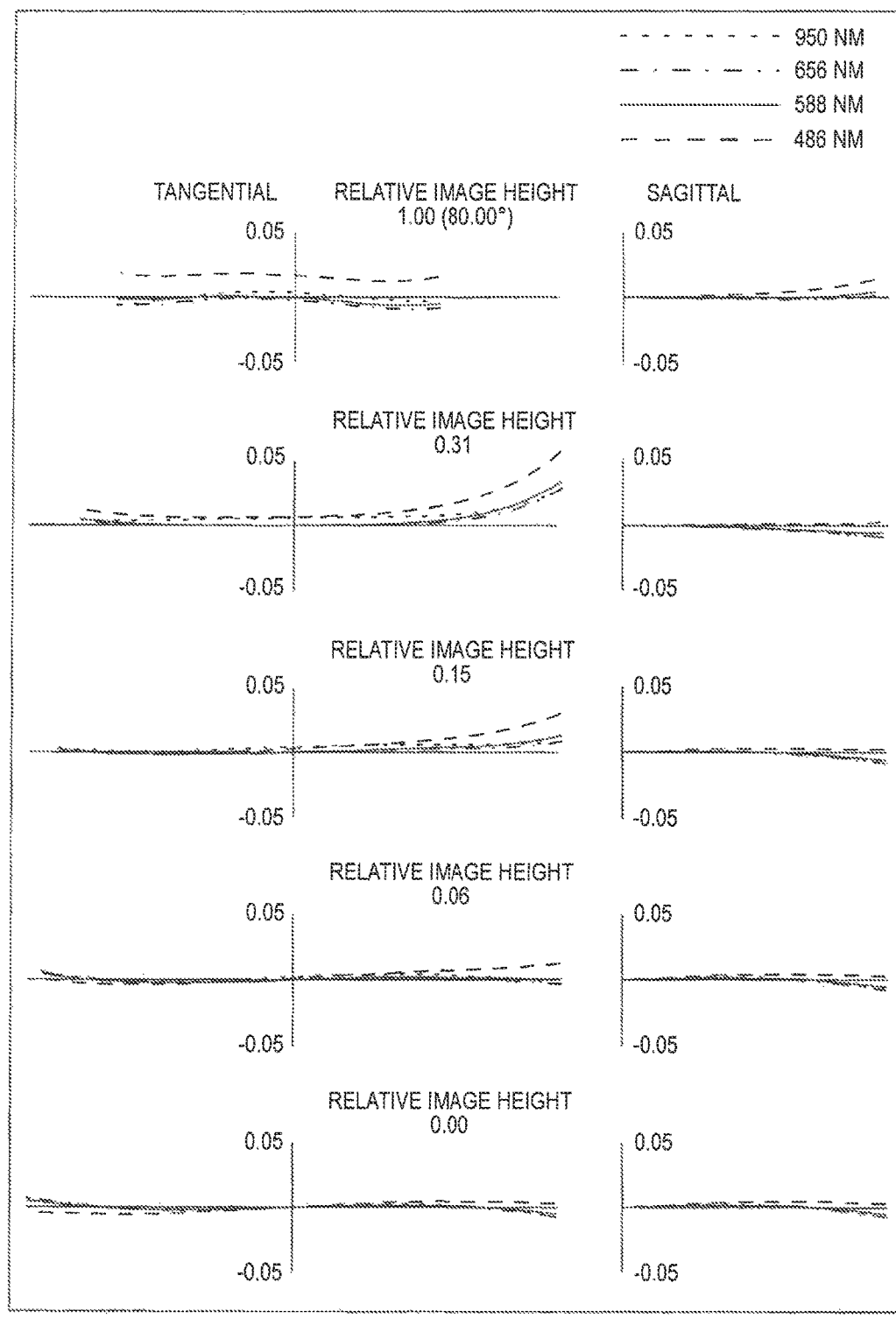
FIG. 13 is a lateral aberration diagram of the imaging lens system according to Example 4.

FIG. 12 is a reduction-side aberration diagram of the imaging lens system and shows spherical aberration, astigmatism, and distortion sequentially from the left, as shown in FIG. 12. FIG. 13 is a lateral aberration diagram of the imaging lens system and corresponds to FIG. 12. FIG. 13 shows lateral aberrations at the relative image heights of 1.00, 0.31, 0.15, 0.06, and 0.00 sequentially from above.

Example 5

Table 8 shown below shows data on the lens surfaces in Example 5.

TABLE 8 f 1.693
FNo 2.0
θ 80.0°

| | R | D | Nd | Vd |
|---|---|---|---|---|
| OBJ | Infinity | 300.000 | | |
| 1 | 16.612 | 1.000 | 1.81600 | 46.62 |
| 2 | 6.863 | 2.810 | | |
| 3 | 14.662 | 0.900 | 1.81600 | 46.62 |
| 4 | 4.664 | 3.057 | | |
| 5 | −24.071 | 0.800 | 1.80610 | 40.93 |
| 6 | 7.109 | 0.917 | | |
| *7 | 26.046 | 3.000 | 1.92286 | 20.88 |
| *8 | −8.393 | 4.874 | | |
| STO9 | Infinity | 0.100 | | |
| 10 | 10.410 | 1.000 | 1.58913 | 61.13 |
| 11 | −6.396 | 0.771 | | |
| 12 | −5.002 | 0.700 | 1.84666 | 23.78 |
| 13 | 4.527 | 1.771 | 1.62041 | 60.29 |
| 14 | −60.009 | 0.100 | | |
| *15 | 8.000 | 3.200 | 1.69680 | 55.46 |
| *16 | −4.236 | 1.000 | | |
| 17 | Infinity | 1.800 | 1.51633 | 64.14 |
| 18 | Infinity | 3.000 | | |
| IMG | Infinity | 0.000 | | |

Figure 14:
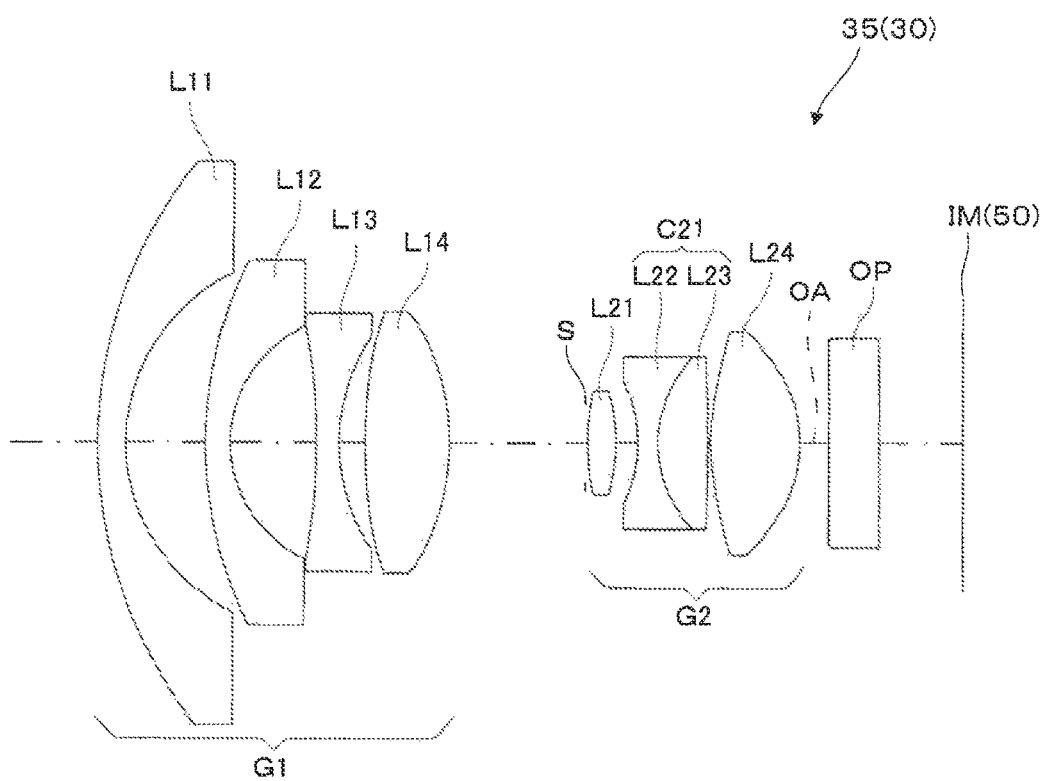
FIG. 14 shows the configuration of an imaging lens system according to Example 5.

FIG. 14 is a cross-sectional view of an imaging lens system according to Example 5.

Table 9 shown below shows aspheric coefficients of the lens surfaces in Example 5.

TABLE 9

| | Surface number | | | |
|---|---|---|---|---|
| | 7 | 8 | 15 | 16 |
| K | 0.0000 | 1.4859 | 0.3253 | 0.0000 |
| A04 | 7.5025E−04 | 6.8766E−04 | −2.3930E−03 | 1.9477E−03 |
| A06 | −1.2247E−05 | −8.8345E−07 | 4.8260E−05 | 8.0420E−05 |
| A08 | 0.0000E+00 | 0.0000E+00 | 0.0000E+00 | −8.9000E−06 |
| A10 | 0.0000E+00 | 0.0000E+00 | 0.0000E+00 | 6.4376E−07 |

The imaging lens system 30 (imaging lens 35) includes, as the first lens group G1, the following lenses sequentially arranged from the enlargement side: a first lens (lens L11) that is a negative meniscus lens having a convex surface facing the enlargement side; a second lens (lens L12) that is a negative meniscus lens having a convex surface facing the enlargement side; a third lens (lens L13) that is a biconcave negative lens; and a fourth lens (lens L14) that is a biconvex positive lens. The imaging lens system 30 (imaging lens 35) includes, as the second lens group G2, the following lenses sequentially arranged from the enlargement side: a fifth lens (lens L21) that a biconvex positive lens; a cemented lens C21, which is formed of a sixth lens (lens L22) that is a biconcave negative lens and a seventh lens (lens L23) that is a biconvex positive lens; and an eighth lens (lens L24) that is a biconvex positive lens. That is, the imaging lens system 30 is formed of eight lenses. The eight lenses L11 to L14 and L21 to L24 each have a circular shape axially symmetric with respect to the optical axis OA. Among the eight lenses, the fourth lens L14 and the eighth lens L24 each have aspheric surfaces on both sides. The other surfaces are all spherical surfaces.

In Example 5, introducing two aspheric lenses achieves further reduction in the number of lenses and compactness.

In Example 5, the first lens group G1 is formed of four lenses sequentially arranged from the enlargement side, two meniscus lenses (lenses L11 and L12) each having a convex surface facing the enlargement side, a negative lens (lens L13), and a biconvex positive lens (lens L14), and the negative lenses are all formed of spherical lenses.

Figure 15:
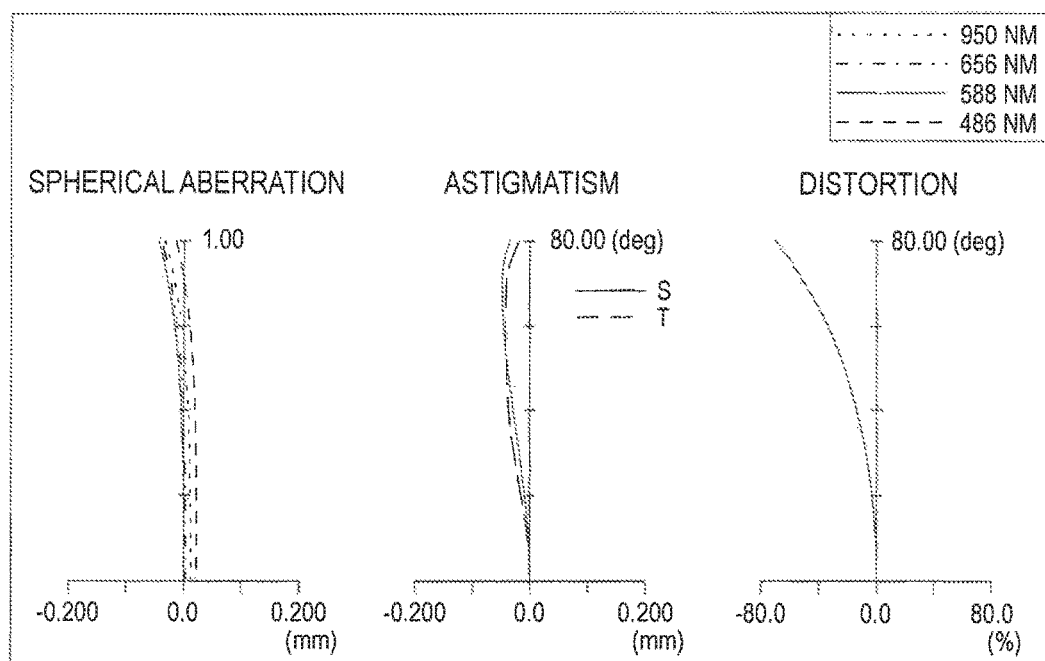
FIG. 15 is a reduction-side aberration diagram of the imaging lens system according to Example 5.
Figure 16:
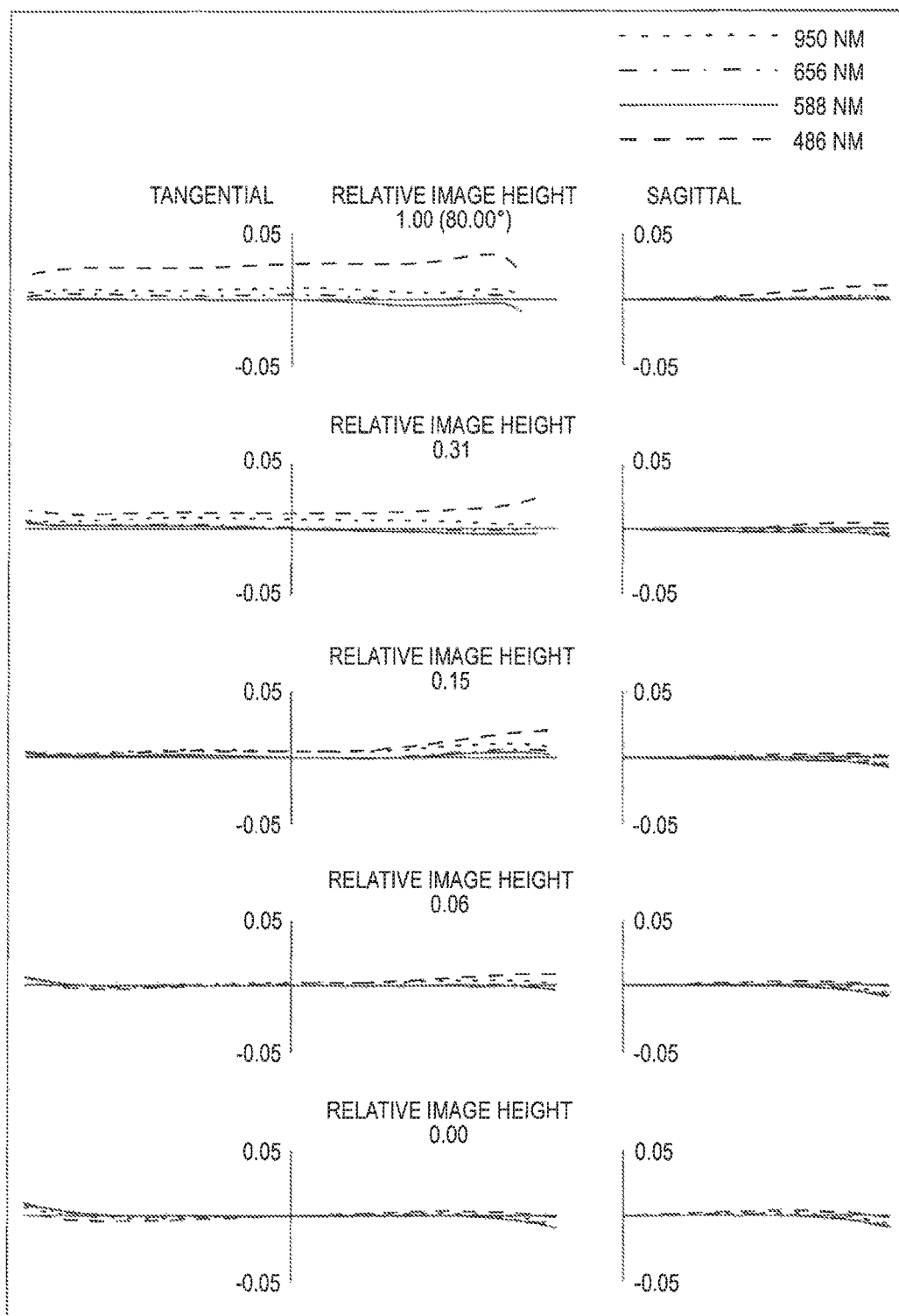
FIG. 16 is a lateral aberration diagram of the imaging lens system according to Example 5.

FIG. 15 is a reduction-side aberration diagram of the imaging lens system and shows spherical aberration, astigmatism, and distortion sequentially from the left, as shown in FIG. 15. FIG. 16 is a lateral aberration diagram of the imaging lens system and corresponds to FIG. 15. FIG. 16 shows lateral aberrations at the relative image heights of 1.00, 0.31, 0.15, 0.06, and 0.00 sequentially from above.

Example 6

Table 10 shown below shows data on the lens surfaces in Example 6.

TABLE 10 f 1.693
FNo 2.1
θ 80.0°

| | R | D | Nd | Vd |
|---|---|---|---|---|
| OBJ | Infinity | 300.000 | | |
| 1 | 15.286 | 1.000 | 1.81600 | 46.62 |
| 2 | 7.233 | 2.718 | | |
| 3 | 13.882 | 0.900 | 1.81600 | 46.62 |
| 4 | 5.010 | 2.514 | | |
| 5 | 54.194 | 0.800 | 1.80610 | 40.93 |
| 6 | 5.320 | 1.019 | | |

TABLE 10-continued f 1.693
FNo 2.1
θ 80.0°

|  | R | D | Nd | Vd |
|---|---|---|---|---|
| *7 | 14.907 | 3.000 | 1.92286 | 20.88 |
| 8 | −6.286 | 0.900 | 1.83481 | 42.72 |
| 9 | −45.046 | 4.281 |  |  |
| 10 | 6.436 | 1.000 | 1.59282 | 68.62 |
| 11 | −7.721 | 0.000 |  |  |
| STO12 | Infinity | 1.321 |  |  |
| 13 | −3.875 | 0.700 | 1.92286 | 20.88 |
| 14 | 16.046 | 1.758 | 1.69350 | 53.34 |
| 15 | −7.926 | 0.100 |  |  |
| *16 | 13.584 | 2.600 | 1.72903 | 54.04 |
| *17 | −4.788 | 1.000 |  |  |
| 18 | Infinity | 1.800 | 1.51633 | 64.14 |
| 19 | Infinity | 3.000 |  |  |
| IMG | Infinity | 0.000 |  |  |

Figure 17:
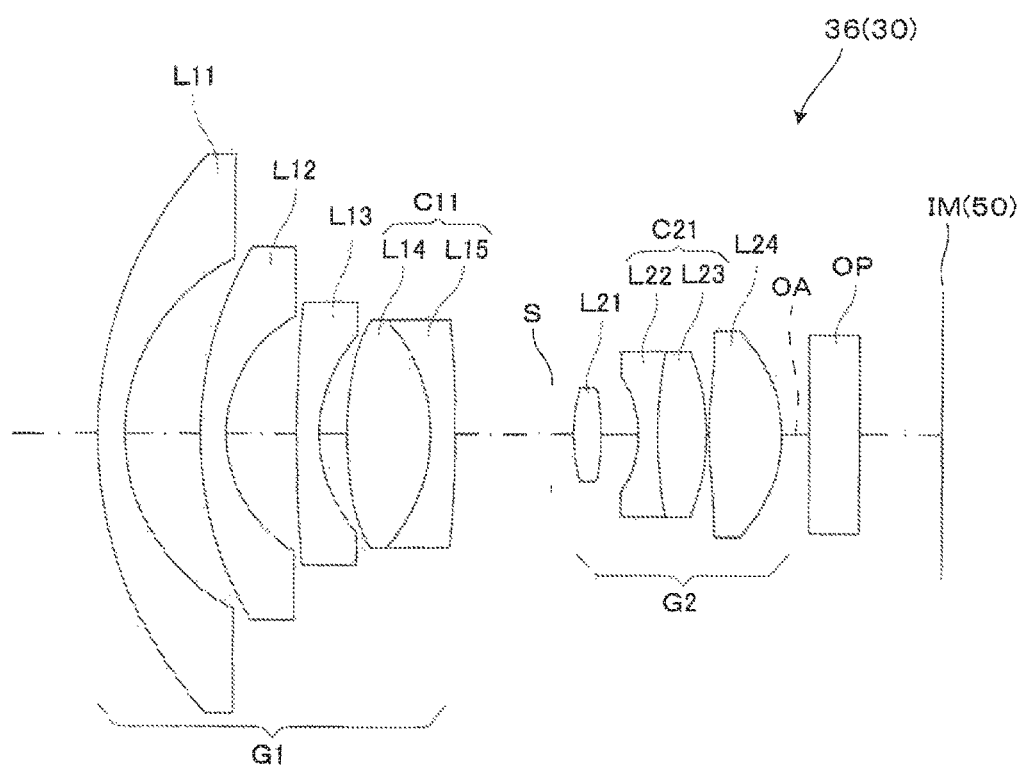
FIG. 17 shows the configuration of an imaging lens system according to Example 6.

FIG. 17 is a cross-sectional view of an imaging lens system according to Example 6.

Table 11 shown below shows aspheric coefficients of the lens surfaces in Example 6.

TABLE 11

|  | Surface number | | |
|---|---|---|---|
|  | 7 | 16 | 17 |
| K | 9.3788 | −20.4300 | −0.8149 |
| A04 | 2.3980E−04 | −7.8752E−04 | 6.2717E−04 |
| A06 | −4.7141E−06 | −3.6927E−05 | −4.9594E−05 |
| A08 | 0.0000E+00 | 0.0000E+00 | 0.0000E+00 |
| A10 | 0.0000E+00 | 0.0000E+00 | 0.0000E+00 |

The imaging lens system 30 (imaging lens 36) includes, as the first lens group G1, the following lenses sequentially arranged from the enlargement side: a first lens (lens L11) that is a negative meniscus lens having a convex surface facing the enlargement side; a second lens (lens L12) that is a negative meniscus lens having a convex surface facing the enlargement side; a third lens (lens L13) that is a negative meniscus lens having a convex surface facing the enlargement side; and a cemented lens C11, which is formed of a fourth lens (lens L14) that is a biconvex positive lens and a fifth lens (lens L15) that is a negative meniscus lens having a convex surface facing the reduction side. The imaging lens system 30 (imaging lens 36) includes, as the second lens group G2, the following lenses sequentially arranged from the enlargement side: a sixth lens (lens L21) that is a biconvex positive lens; a cemented lens C21, which is formed of a seventh lens (lens L22) that is a biconcave negative lens and an eighth lens (lens L23) that is a biconvex positive lens; and a ninth lens (lens L24) that is a biconvex positive lens. That is, the imaging lens system 30 is formed of nine lenses. The nine lenses L11 to L15 and L21 to L24 each have a circular shape axially symmetric with respect to the optical axis OA. Among the nine lenses, the enlargement-side surface of the fourth lens L14 and the both surfaces of the ninth lens L24 each have an aspheric surface. The other surfaces are all spherical surfaces.

In Example 6, the first lens group G1 is formed of five lenses, three negative meniscus lenses (lenses L11 to L13) each having a convex surface facing the enlargement side and the cemented lens C21 formed of a set of a positive lens and a negative lens (lenses L14 and L15), and the negative lenses (lenses L11 to L13, L15, and L22) are all formed of spherical lenses.

Further, in Example 6, the second lens group G2 is formed of a positive lens having a convex surface facing the reduction side (lens L21), the cemented lens C21, which is formed of a set of a negative lens having a concave surface facing the enlargement side and a biconvex positive lens (lenses L22 and L23), and a single positive lens (L24) sequentially arranged from the enlargement side, whereby the second lens group G2 is compact with a balance between the first lens group G1 and the second lens group G2 achieved.

Figure 18:
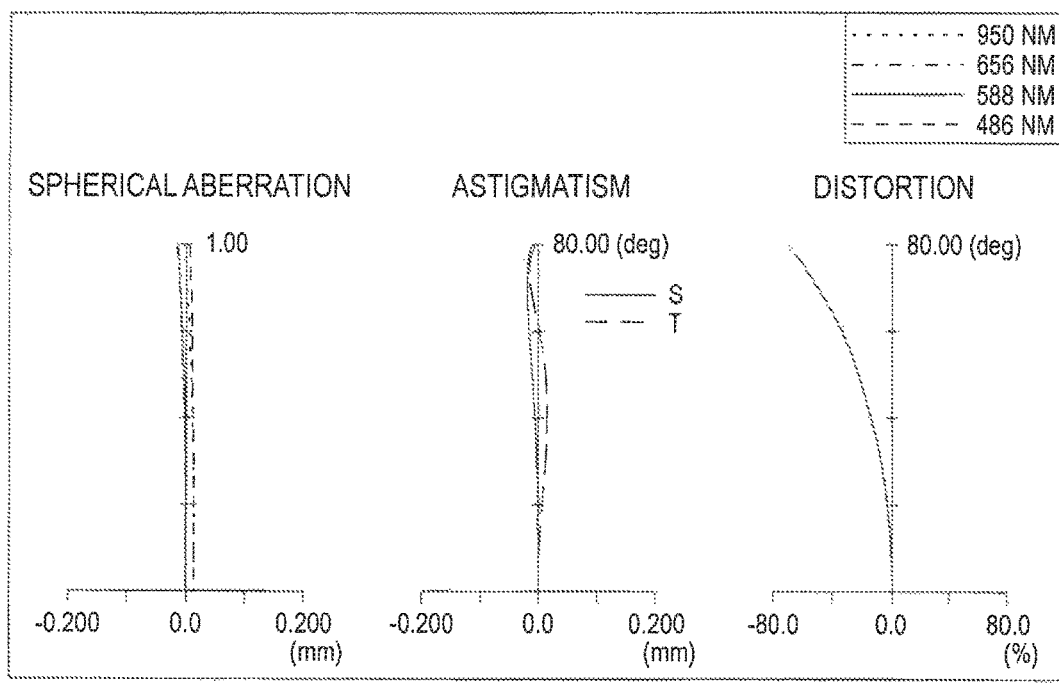
FIG. 18 is a reduction-side aberration diagram of the imaging lens system according to Example 6.
Figure 19:
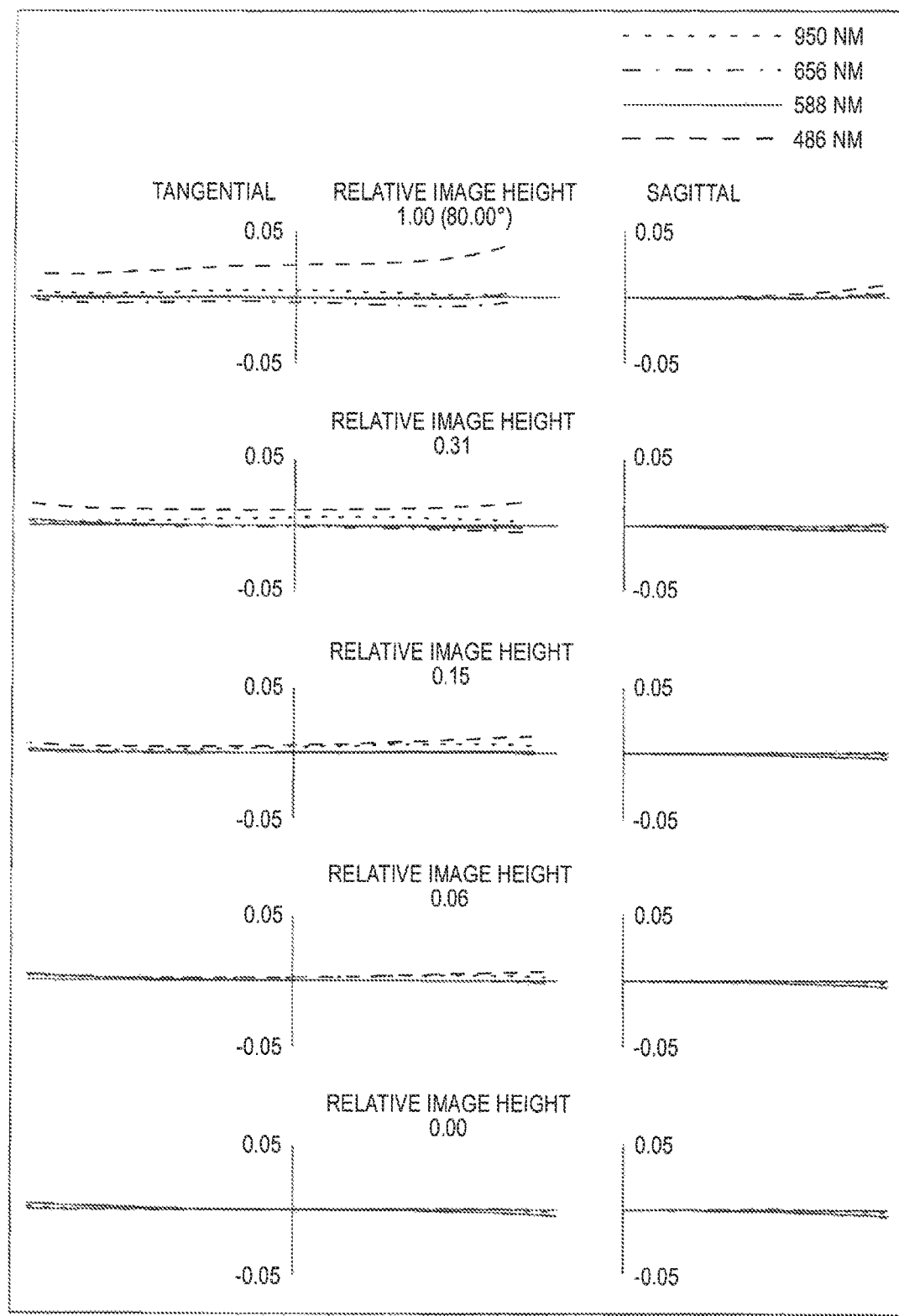
FIG. 19 is a lateral aberration diagram of the imaging lens system according to Example 6.

FIG. 18 is a reduction-side aberration diagram of the imaging lens system and shows spherical aberration, astigmatism, and distortion sequentially from the left, as shown in FIG. 18. FIG. 19 is a lateral aberration diagram of the imaging lens system and corresponds to FIG. 18. FIG. 19 shows lateral aberrations at the relative image heights of 1.00, 0.31, 0.15, 0.06, and 0.00 sequentially from above.

Overview of Examples

The conditional expressions (1) to (6) in Examples 1 to 6 described above will be considered below.

Table 12 shown below shows the amount of error of the image height with respect to the image height obtained when α is set at 2.0 in the conditional expression (1) (ideal image height) in a case where the half field angle θ changes from 0 to 80°. The amounts of error in Examples are each smaller than or equal to 3.4%, which is sufficiently smaller than those obtained by:

conditional expression (1) $y=\alpha \cdot f \cdot \tan(\theta/2)$ $(1.8 \leq \alpha \leq 2.2)$ showing that the stereographic projection method is sufficiently satisfied.

TABLE 12

| Half filed angle | Example 1 | Example 2 | Example 3 | Example 4 | Example 5 | Example 6 |
|---|---|---|---|---|---|---|
| 0 | 0.00% | 0.00% | 0.00% | 0.00% | 0.00% | 0.00% |
| 10 | 0.06% | 0.15% | 0.05% | 0.17% | 0.05% | 0.15% |
| 20 | 0.35% | 0.44% | 0.08% | 0.46% | 0.16% | 0.44% |
| 30 | 0.83% | 0.92% | 0.14% | 0.91% | 0.31% | 0.92% |
| 40 | 1.45% | 1.55% | 0.23% | 1.51% | 0.49% | 1.55% |
| 50 | 2.16% | 2.27% | 0.34% | 2.17% | 0.67% | 2.27% |
| 60 | 2.84% | 2.96% | 0.46% | 2.79% | 0.83% | 2.96% |
| 70 | 3.18% | 3.37% | 0.52% | 3.09% | 0.93% | 3.37% |
| 80 | 2.37% | 2.97% | 0.44% | 2.33% | 0.72% | 2.97% |

Table 13 shown below shows values of the conditional expressions (2) to (6) in Examples 1 to 6. Table 13 shows that the values all satisfy the ranges (conditions) of the conditional expressions (2) to (6).

TABLE 13

|  | Example 1 | Example 2 | Example 3 | Example 4 | Example 5 | Example 6 |
|---|---|---|---|---|---|---|
| (2) 1.0 < \|f1\|/f\| < 2.5 | 1.911 | 2.098 | 1.267 | 1.876 | 1.239 | 1.498 |
| (3) 2.0 < f2/f < 4.0 | 3.105 | 2.759 | 3.295 | 3.446 | 3.283 | 3.284 |
| (4) 15.0 < Vd1 < 30.0 | 20.2 | 23.8 | 24.4 | 25.5 | 23.8 | 23.3 |
| (5) Vd2 > 50.0 | 62.2 | 65.0 | 68.9 | 59.8 | 59.0 | 58.7 |
| (6) 10 < TL/f < 20 | 14.483 | 16.124 | 14.793 | 17.765 | 14.768 | 14.538 |

As described above, the imaging lens system according to the present embodiment and the imaging apparatus equipped with the imaging lens system, although they employ the stereographic projection method, allow the number of constituent lenses to be equal to those in the orthographic projection method and the equisolid angle projection method, a short overall length and compactness to be achieved, the imaging lens system and the imaging apparatus to be incorporated into a variety of instruments, and high resolution to be achieved. Further, no small-curvature surface or any other undesirable surface is present as compared with a fisheye lens of related art, whereby the imaging lens system and the imaging apparatus are advantageous from the viewpoint of manufacture and allow cost reduction. That is, the imaging lens system according to the present embodiment is a fisheye-type imaging lens having a significantly wide field angle, employs the stereographic projection method to reduce the degree of the compression at the periphery of an image and provide high resolution down to the periphery, and can be used, of course, in a typical monitoring application and can further be built in a compact household electric appliance because the imaging lens system is compact and has a short overall length. Specifically, it is conceivable that the imaging lens system can be used, for example, not only in a case where the imaging lens system is incorporated in what is called an interactive projector and images an irradiated area but in a case where the imaging lens system is incorporated in a household indoor air conditioner or any other similar instrument, senses a person and an animal, monitors the indoor temperature, and performs other actions.

As an application of the imaging lens system and hence the imaging apparatus according to the present embodiment, a projector according to the present embodiment that incorporates the imaging apparatus equipped with the imaging lens system will be described below with reference to FIGS. 20 and 21. A projector capable of what is called interactive image projection, for example, the projector shown in JP-A-1012-150638, is considered as the projector described below.

Figure 20:
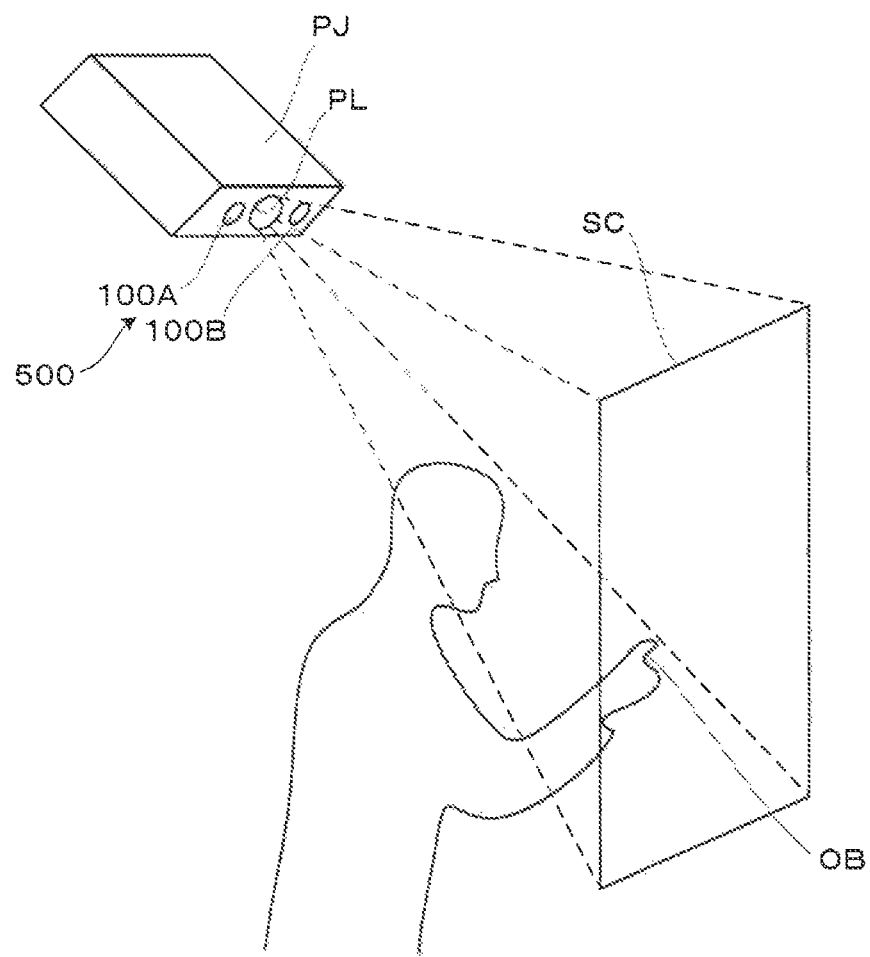
FIG. 20 shows an example of a projector that incorporates the imaging apparatus according to the embodiment.

FIG. 20 shows an example of a projector that incorporates the imaging apparatus according to the embodiment described above. FIG. 21 is a block diagram showing an example of the configuration of the projector. A projector PJ according to the present embodiment is conceivably a projector that is, for example, hung from a ceiling and performs proximity projection in a direction oblique to a screen SC, which is an irradiated area, as shown in FIG. 20 by way of example. The projector PJ includes a projection lens PL, which is a projection system through which projection light (video light) is radiated toward the screen SC, and an imaging section 500, which images an object OB (person's fingertip, in the illustrated example) that appears on the screen SC or in the vicinity thereof to allow an interactive action. The imaging section 500 is formed of two (a plurality of) imaging apparatus 100A and 100B. In particular, in the illustrated example, the two imaging apparatus 100A and 100B are so disposed as to be close to the projection lens PL but separate from each other and image the screen SC, which is an area irradiated with the projection light (video light) through the projection lens PL, and an area around the screen SC. The imaging action allows acquisition of image data on not only an area which is part of the screen SC, which is the irradiated area, and in which an image is projected by the projector PJ but an area around the area described above. In particular, the two imaging apparatus 100A and 100B allow acquisition of parallax information (or stereo image). That is, the two equipped imaging apparatus (imaging apparatus 100A and 100B) along with the stereo vision allow more advanced position detection. It is noted in this case that since the imaging apparatus 100A and 100B are disposed in the vicinity of the projection lens PL, which performs proximity projection in an oblique direction, an acquired image of the screen SC or any other object is captured also in the oblique direction.

Figure 21:
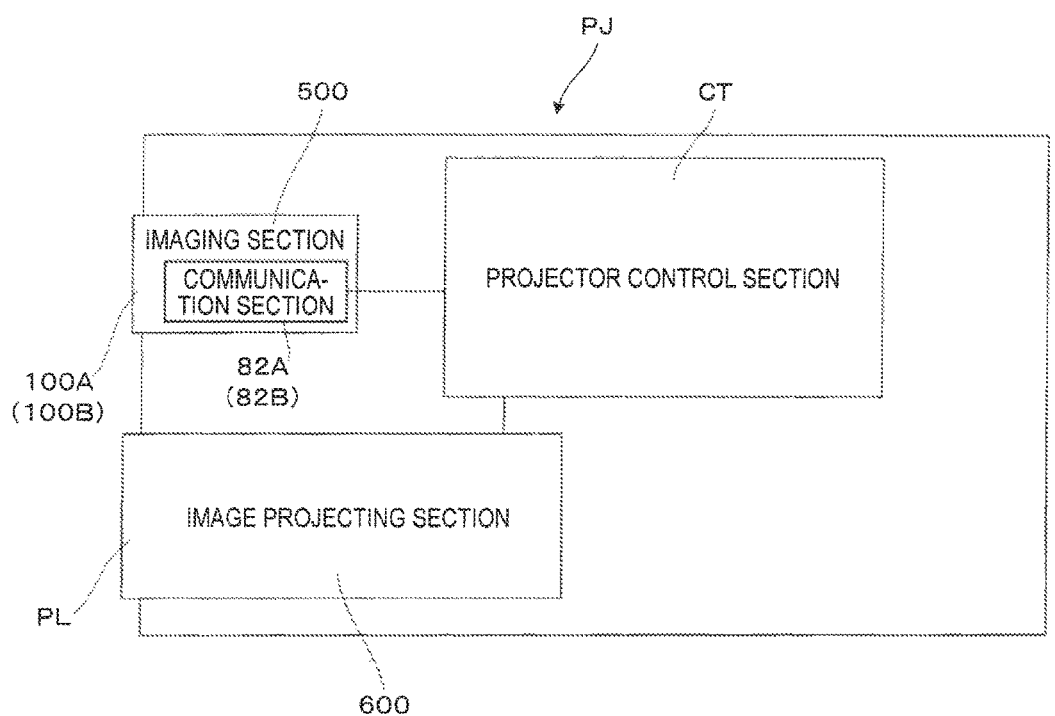
FIG. 21 is a block diagram showing an example of the configuration of the projector.

It is further assumed in the projector PJ that the imaging section 500, which is formed of the two imaging apparatus 100A and 100B, and an image projecting section 600, which includes the projection lens PL, are controlled in terms of action thereof by a projector control section CT, as shown in FIG. 21 by way of example. That is, the imaging section 500 communicates with the projector control section CT, for example, via communication sections 81A and 82B and acquires image information for allowing stereo-vision-based position detection on the screen SC and in the vicinity thereof under the control of the projector control section CT. The projector control section CT causes the image projecting section 600 to project an image that reflects information on the position of the object OB (tip of pen or fingertip) detected by using parallax information based on the image information acquired by the imaging performed by the imaging section 500 to allow what is called interactive image projection. In particular, in the present embodiment, in which the imaging section 500 uses the imaging apparatus 100A and 100B capable of high-resolution imaging described above, high-resolution image data can be acquired even in the case where proximity imaging of the screen SC is performed in an oblique direction. In particular, data on an image with a small degree of compression also at the periphery thereof can be acquired. That is, for example, even in a case where the tip of a pen or a fingertip is present in the vicinity of the screen on which the projector projects an image, for example, in a position around the screen SC, the position of the tip of the pen or the fingertip can be reliably detected.

The above example has been described with reference to the case where a plurality of (two in the example) imaging apparatus are provided, but the projector described above is conceivably formed of one imaging apparatus. Further, for example, an apparatus that radiates infrared rays in such a way that the infrared rays cover the surface of a screen and an area around the screen (apparatus that scans the surface with infrared light in such a way that the surface is irradiated with an infrared light curtain) may be provided, and the apparatus may be used with a method for capturing the infrared light reflected off an object that appears in a position around the screen. For example, it is conceivable to detect a pen, a fingertip, or any other object by analysis of the area of an image captured by the imaging apparatus and corresponding to the position captured by using the reflected light. Further, a projector using three or more imaging apparatus may be conceivable.

The invention is not limited to the embodiment and Examples described above and can be implemented in a variety of other aspects to the extent that they do not depart from the substance of the invention.

For example, the imaging apparatus may be incorporated in a variety of apparatus other than a projector (such as household indoor air conditioner), as described above. Further, in the above description, the imaging apparatus captures both visible light and infrared light. Instead, only visible light or infrared light may be received in correspondence, for example, with a feature necessary for an apparatus that incorporates the imaging apparatus.

Further, for example, in each of Examples, at least one lens having substantially no power can be added in a position upstream or downstream of the lenses that form each of the lens groups or between any adjacent ones of the lenses that form each of the lens groups.

The entire disclosure of Japanese Patent Application No. 2016-225731, filed Nov. 21, 2016 is expressly incorporated by reference herein.

What is claimed is:

1. An imaging lens system comprising: a first lens group having a negative or positive focal length; and a second lens group having a positive focal length with the first lens group and the second lens group sequentially arranged from an enlargement side,
   wherein the imaging lens system has a half field angle of at least 70°,
   the first lens group is formed of three negative lenses and one positive lens or a cemented lens sequentially arranged from the enlargement side, and
   the imaging lens system satisfies the following conditional expressions (1) and (2):

$$y = \alpha \cdot f \tan(\theta/2); \text{ and} \quad (1)$$

$$1.0 < |f1/f| < 2.5, \quad (2)$$

where
   y: Image height,
   $\alpha$: $1.8 \leq \alpha \leq 2.2$,
   f: Focal length of entire imaging lens system,
   $\theta$: Half field angle, and
   f1: Combined focal length of three negative lenses disposed on enlargement side in first lens group.

2. The imaging lens system according to claim 1, wherein the second lens group is formed of a positive lens, a cemented lens formed of a set of a negative lens and a positive lens, and at least one positive lens having a convex surface facing a reduction side with the lenses sequentially arranged from the enlargement side, and the imaging lens system satisfies the following conditional expression (3):

$$2.0 < f2/f < 4.0, \quad (3)$$

where f2 represents the focal length of the second lens group.

3. The imaging lens system according to claim 1, wherein the first lens group is formed of five lenses sequentially arranged from the enlargement side, the three negative lenses that are meniscus lenses each having a convex surface facing the enlargement side and the cemented lens formed of a set of a negative lens and a positive lens, and the negative lenses are all formed of spherical lenses.

4. The imaging lens system according to claim 1, wherein the first lens group is formed of four lenses sequentially arranged from the enlargement side, the three negative lenses that are two meniscus lenses each having a convex surface facing the enlargement side and one negative lens, and the positive lens is a biconvex lens, and the negative lenses are all formed of spherical lenses.

5. The imaging lens system according to claim 1, wherein the second lens group is formed of a positive lens having a convex surface facing a reduction side, a doublet formed of a set of a negative lens having a concave surface facing the enlargement side and a biconvex positive lens, and at least one positive lens sequentially arranged from the enlargement side.

6. The imaging lens system according to claim 1, wherein at least one convex aspheric surface is on a lens having positive power.

7. The imaging lens system according to claim 1, wherein let Vd1 be a difference between an average of Abbe numbers of the negative lenses in the first lens group and an Abbe number of the positive lens in the first lens group, and let Vd2 be an average of Abbe numbers of positive lenses in the second lens group, and the following conditional expressions (4) and (5) are satisfied:

$$15.0 < Vd1 < 30.0; \text{ and} \quad (4)$$

$$Vd2 > 50.0. \quad (5)$$

8. The imaging lens system according to claim 1, wherein let TL be an overall length of the imaging lens system from a first lens on the enlargement side to a last lens on a reduction side, and the following conditional expression (6) is satisfied:

$$10 < TL/f < 20. \quad (6)$$

9. An imaging apparatus comprising the imaging lens system according to claim 1.

10. An imaging apparatus comprising the imaging lens system according to claim 2.

11. An imaging apparatus comprising the imaging lens system according to claim 3.

12. An imaging apparatus comprising the imaging lens system according to claim 4.

13. An imaging apparatus comprising the imaging lens system according to claim 5.

14. An imaging apparatus comprising the imaging lens system according to claim 6.

15. A projector comprising: at least one imaging apparatus according to claim 9; and a projection system that projects video light,
   wherein the imaging apparatus images an area irradiated with the video light projected via the projection system.

16. A projector comprising: at least one imaging apparatus according to claim 10; and a projection system that projects video light,
   wherein the imaging apparatus images an area irradiated with the video light projected via the projection system.

17. A projector comprising: at least one imaging apparatus according to claim 11; and a projection system that projects video light,
   wherein the imaging apparatus images an area irradiated with the video light projected via the projection system.

18. A projector comprising: at least one imaging apparatus according to claim 12; and a projection system that projects video light,
   wherein the imaging apparatus images an area irradiated with the video light projected via the projection system.

19. A projector comprising: at least one imaging apparatus according to claim 13; and a projection system that projects video light,
   wherein the imaging apparatus images an area irradiated with the video light projected via the projection system.

20. The projector according to claim 10, comprising two imaging apparatus.

* * * * *